United States Patent
Brahma et al.

(10) Patent No.: US 11,875,551 B2
(45) Date of Patent: Jan. 16, 2024

(54) COLLECTING AND PROCESSING DATA FROM VEHICLES

(71) Applicants: VOLKSWAGEN AKTIENGESELLSCHAFT, Wolfsburg (DE); PORSCHE AG, Stuttgart (DE); AUDI AG, Ingolstadt (DE)

(72) Inventors: Pratik Brahma, San Mateo, CA (US); Nikhil George, Palo Alto, CA (US); Oleg Zabluda, Redwood City, CA (US)

(73) Assignees: NAVBIRSWAGEN AKTIENGESELLSCHAFT, Wolfsburg (DE); PORSCHE AG, Stuttgart (DE); AUDI AG, Ingolstadt (DE)

( * ) Notice: Subject to any disclaimer, the term of this patent is extended or adjusted under 35 U.S.C. 154(b) by 331 days.

(21) Appl. No.: 16/896,938

(22) Filed: Jun. 9, 2020

(65) Prior Publication Data
US 2021/0383209 A1     Dec. 9, 2021

(51) Int. Cl.
*G06F 16/00*     (2019.01)
*G06V 10/764*    (2022.01)
(Continued)

(52) U.S. Cl.
CPC ........ *G06V 10/764* (2022.01); *G06F 16/9024* (2019.01); *G06F 16/9035* (2019.01);
(Continued)

(58) Field of Classification Search
CPC .. G06F 3/011; G06F 11/3055; G06F 11/3433; G06F 11/3438; G06F 3/013;
(Continued)

(56) References Cited

U.S. PATENT DOCUMENTS 6,304,864 B1 * 10/2001 Liddy ................. G06F 16/9535
                                                     706/15
2019/0102741 A1 * 4/2019 Gupta ................ G06Q 10/0635
(Continued)

FOREIGN PATENT DOCUMENTS

DE     102018219125 A1     5/2020

OTHER PUBLICATIONS

International Search Report and Written Opinion dated Sep. 24, 2021 for International application No. PCT/EP2021/065205.
(Continued)

*Primary Examiner* — Shyue Jiunn Hwa
(74) *Attorney, Agent, or Firm* — Womble Bond Dickinson (US) LLP

(57) ABSTRACT

In one embodiment, a method includes obtaining candidate data generated by a vehicle. The candidate data comprises a subset of sensor data identified based on a set of neural network models executing on the vehicle. The method also includes determining whether the candidate data can be associated with one or more categories of a set of categories for training data based on a set of categorization models. The method further includes associating the candidate data with the first category in response to determining that the candidate data can be associated with at a first category of the set of categories. The method further includes determining whether the candidate data can be associated with a second category. The set of categories lacks the second category. The method further includes including the second category in the set of categories in response to determining that the candidate data can be associated with the second category. The method further includes associating the candidate data with the second category.

19 Claims, 15 Drawing Sheets

(51) Int. Cl.
    *G06F 16/9035*    (2019.01)
    *G06F 16/901*    (2019.01)
    *G06N 3/08*    (2023.01)
    *G06F 18/214*    (2023.01)
    *G06V 10/82*    (2022.01)
    *G06V 10/94*    (2022.01)
    *G06V 20/56*    (2022.01)

(52) U.S. Cl.
    CPC .............. *G06F 18/214* (2023.01); *G06N 3/08* (2013.01); *G06V 10/82* (2022.01); *G06V 10/945* (2022.01); *G06V 20/56* (2022.01)

(58) Field of Classification Search
    CPC . G06F 3/017; G06F 3/14; G06F 21/32; G06F 2203/011; G06F 2221/2111; G06F 16/2379; G06F 16/27; G06F 18/22; G06F 18/23; G06F 18/241; G06F 9/466; G06F 9/543; G06F 16/433; G06F 16/434; G06F 16/438; G06F 16/90332; G06F 18/24143; G06F 30/27
    See application file for complete search history.

(56) References Cited

U.S. PATENT DOCUMENTS

2020/0017117 A1* 1/2020 Milton ................. G08G 1/0137
2020/0143561 A1* 5/2020 Hallett .................... G08B 5/22
2022/0148051 A1* 5/2022 Bagnall ................. G06Q 10/20

OTHER PUBLICATIONS

Genc et al., "Zero-Shot Reinforcement Learning with Deep Attention Convolutional Neural Networks", arxiv.org, Cornell University Library, Jan. 2, 2020, pp. 1-12.
Anonymous "Zero-shot learning—Wikipedia", https://en.wikipedia.org/w/index.php?title=Zero-shotlearning&oldid=952085110, Apr. 20, 2020.
Shu et al., "Unseen Class Discovery in Open-World Classification", arxiv.org, Cornell University Library, Jan. 17, 2018, pp. 1-10.
Anonymous "Incremental learning—Wikipedia", https://en.wikipedia.org/w/index.php?title=Incrementallearning&oldid=801992775, Sep. 23, 2017.
Bendale et al., "Towards Open Word Recognition", 2015 IEEE Conference on Computer Vision and Pattern Recognition (CVPR), IEEE, Jun. 7, 2015, pp. 1893-1902.
Fei et al., "Breaking the Closed World Assumption in Text Classification", Proceedings of the 2016 Conference of the North American Chapter of the Association for Computational Linguistics: Human Language Technologies, Jun. 17, 2016, pp. 506-514.
Anonymous "Multidimensional Scaling", NCSS Documentation, https://web.archive.org/web/20150924105546, Sep. 24, 2015, pp. 1-17.
Narayan et al., "Latent Embedding Feedback and Discriminative Features for Zero-Shot Classification", arxiv.org, Cornell University Library, Mar. 17, 2020, pp. 1-20.

* cited by examiner

COLLECTING AND PROCESSING DATA FROM VEHICLES

TECHNICAL FIELD

Aspects of the present disclosure relate to digital assets, and more particularly, to collecting and processing data from vehicles.

BACKGROUND

As devices become more complex and as more devices operate autonomously (e.g., autonomous vehicles (AVs)), machine learning (ML) models, artificial intelligence (AI) models, etc., are often used to control the operation of these complex and/or autonomous devices. Developing these models may be an expensive and time consuming process. It may be difficult to gather training data and to clean/process the training data. It may also be difficult to select which training data should be used to train a model. Many of the processes or workflows for developing these models is manual (e.g., manually performed by a data scientist/engineer).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Developing AV models (e.g., artificial intelligence (AI) models, machine learning (ML) models, etc.) for autonomous functions are an increasingly time-consuming and difficult task. Users (e.g., data scientists and/or data engineers) may perform various functions, tasks, etc., when developing the AV models. The user may also manage the sensor data that is received from various vehicles (e.g., a fleet of vehicles). These tasks are often manually performed which is time consuming. In addition, these tasks are also prone to error because they are manually done (e.g., users may forget a task or perform a task differently).

In addition, multiple tools, applications, services, software, etc., may be used to develop an AV model. These tools, applications, services, software are often disconnected from each other and are often not compatible with each other (e.g., the output of one tool may not be usable as an input to another tool without modifying the output). Using these disparate and disconnected tools, applications, services, software, etc., further increases the time and complexity of developing AV models.

The examples, implementations, and embodiments described herein may help address these issues when developing AV models. In one embodiment, a data science system provides an end-to-end platform that supports ingesting the data, view/browsing the data, visualizing the data, selecting different sets of data, processing and/or augmenting the data, provisioning of computational and storage resources, and testing AV models. The data science system supports multiple workflows or processes within a single ecosystem/platform which allows users to transition between different phases of the development cycle more easily. The data science system also automates various tasks such as ingesting data, processing data, and/or augmenting data. This may help improve the quality of the AV models that are developed and/or may decrease the amount of time to develop the AV models.

Although the present disclosure may refer to AV models, vehicle models, neural network models, etc., the examples, implementations, aspects, and/or embodiments described herein may be used with other types of models (e.g., other types of machine learning models, other types of artificial intelligence models, etc.). For example, the data science system may be used to develop, modify, update, etc., a driver assistant model (e.g., a ML/AI model that may assist a driver of a vehicle with the operation of the vehicle). In another example, the data science system may be used to develop, modify, update, etc., semi-autonomous neural network model (e.g., a ML/AI model that may partially automate one or more functions/operations of a vehicle, a vehicle model, etc.).

Figure 1:
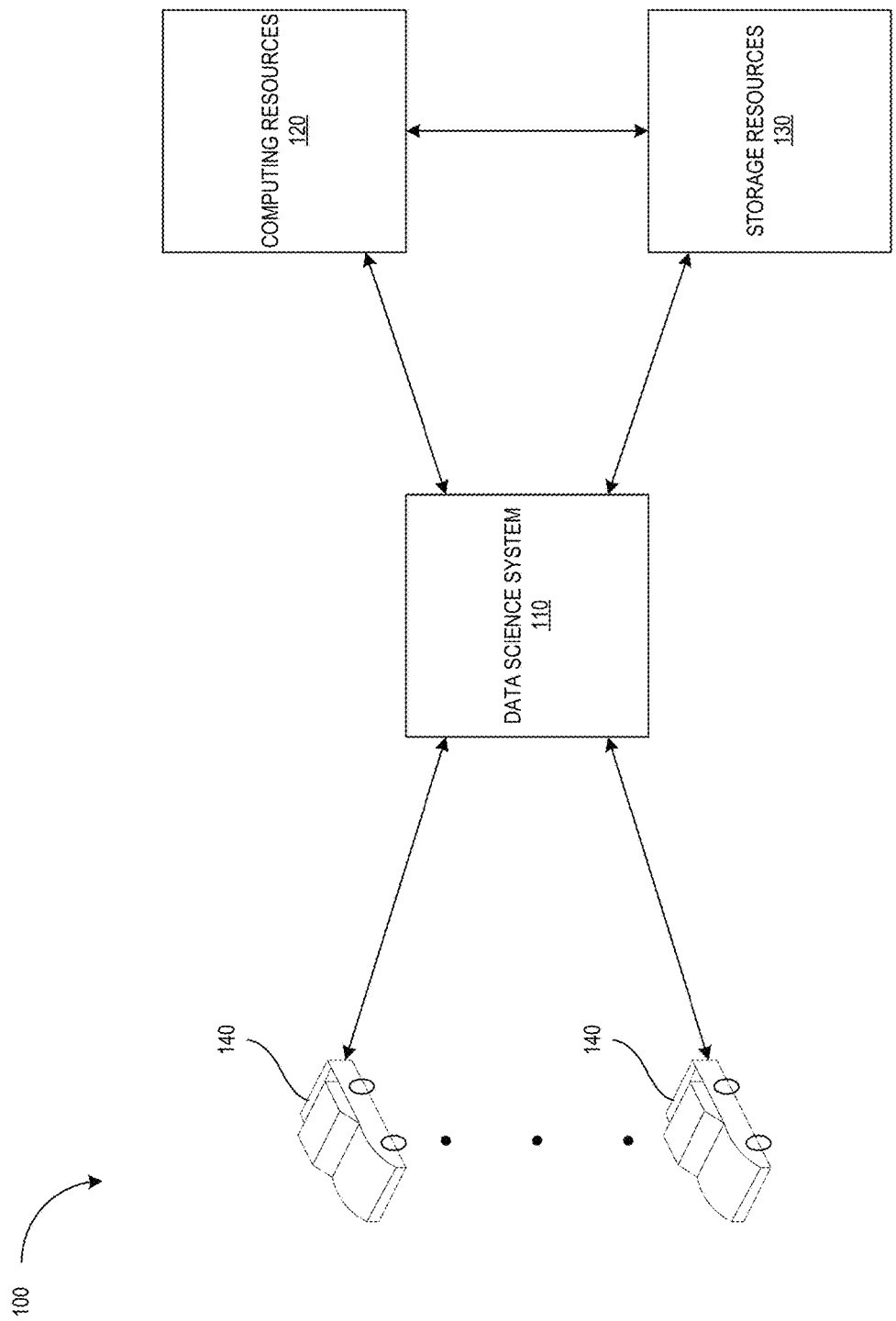
FIG. 1 is a block diagram that illustrates an example system architecture, in accordance with one or more embodiments of the present disclosure.

FIG. 1 is a block diagram that illustrates an example system architecture 100, in accordance with some embodiments of the present disclosure. The system architecture 100 includes a data science system 110, computing resources 120, storage resources 130, and vehicles 140. One or more network may interconnect the vehicles 140, the data science system 110, the computing resources 120, and/or the storage resources 130. A network may be a public network (e.g., the internet), a private network (e.g., a local area network (LAN) or wide area network (WAN)), or a combination thereof. In one embodiment, network may include a wired or a wireless infrastructure, which may be provided by one or more wireless communications systems, such as a wireless fidelity (Wi-Fi) hotspot connected with the network, a cellular system, and/or a wireless carrier system that can be implemented using various data processing equipment, communication towers (e.g. cell towers), etc. The network may carry communications (e.g., data, message, packets, frames, etc.) between the vehicles 140, the data science system 110, the computing resources 120 and/or the storage resources 130.

The vehicles 140 may be commercial vehicles, test vehicles, and/or may be autonomous vehicles (AVs). In one embodiment, the vehicles 140 may be a fleet of vehicles that are used to collect, capture, gather, compile, etc., sensor data and/or other data that may be used to develop, improve, refine, or enhance AV models. AV models may be ML and/or AI models that may be used to manage and/or control the operation of a vehicle. Each of the vehicles 140 may include various sensors that may generate data (e.g., sensor data) as the respective vehicle operates (e.g., drives, moves around, or is otherwise on). Examples of sensors may include, but are not limited to, tire pressure sensors, steering sensors (e.g., to determine the positions/angles of one or more wheels), a compass, temperature sensors, a global positioning system (GPS) receiver/sensor, a light detection and ranging (LIDAR) device/sensor, an ultrasonic device/sensor, a camera (e.g., a video camera), a radar device/sensor, etc. The sensors of the vehicles 140 may generate sensor data such as video data, image data, GPS data, LIDAR data, time series data, etc. Each of the vehicles 140 by way of its sensors may generate gigabytes (e.g., tens, hundreds, thousands, etc., of gigabytes) of data per hour of operation.

The computing resources 120 may include computing devices which may include hardware such as processing devices (e.g., processors, central processing units (CPUs), processing cores), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, rackmount servers, etc. In some examples, the computing devices may include a single machine or may include multiple interconnected machines (e.g., multiple servers configured in a cluster, cloud computing resources, etc.).

The computing resources 120 may also include virtual environments. In one embodiment, a virtual environment may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. The hypervisor may present other software (i.e., "guest" software) the abstraction of one or more virtual machines (VMs) that provide the same or different abstractions to various guest software (e.g., guest operating system, guest applications). A VM may execute guest software that uses an underlying emulation of the physical resources (e.g., virtual processors and guest memory).

In another embodiment, a virtual environment may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. The container engine may also facilitate interactions between the container and the resources of the computing device. The container engine may also be used to create, remove, and manage containers.

The storage resources 130 may include various different types of storage devices, such as hard disk drives (HDDs), solid state drives (SSD), hybrid drives, storage area networks, storage arrays, etc. The storage resources 130 may also include cloud storage resources or platforms which allow for dynamic scaling of storage space.

Although the computing resources 120 and the storage resources 130 are illustrated separate from the data science system 110, one or more of the computing resources 120 and the storage resources 130 may be part of the data science system 110 in other embodiments. For example, the data science system 110 may include both the computing resources 120 and the storage resources 130.

As discussed above, developing AV models (e.g., artificial intelligence (AI) models, machine learning (ML) models, autonomous functions is an increasingly time-consuming and difficult task. Users (e.g., data scientists and/or data engineers) may perform various functions, tasks, etc., when developing the AV models. For example, a user may setup or configure development environments (e.g., computing devices, integrated development/programming environments, and/or software) that may be used to code, create, modify, etc., AV models. In another example, the user may configure the training environment for various AV models. In a further example, a user may perform various pre-processing tasks, such as selecting/finding data, cleaning data (e.g., converting/changing the format of the data), organizing data, etc. The user may also manage the sensor data that is received from the various vehicles 140 (e.g., a fleet of vehicles). These tasks are often manually performed which is time consuming. In addition, these tasks are also prone to error because they are manually done (e.g., users may forget a task or perform do a step different from before).

As AV models become more complex/sophisticated, more and more computing resources and/or storage resources may be used to develop the AV models and/or store the data used by the AV models (e.g., training data). For example, whole clusters or groups of computing devices (e.g., server computers, virtual machines (VMs), containers, etc.) and terabytes, petabytes, etc., of data may be used to train an AV model. In addition, a multiple AV models may be used in a single vehicle 140.

Previously, the development of AV models used various disparate and disconnected tools, applications, services, software, etc. For example, different applications may be used for data configuration management, data collection, feature extraction, data verification, resource management (e.g., storage and/or computing resource management), analysis of data, process management, etc. Using these disparate and disconnected tools, applications, services, software, etc., further increased the time and complexity of developing AV models.

In one embodiment, the data science system 110 may be an application and data-source agnostic system. For example, the data science system 110 may be able to work with a multitude of different applications, services, etc., and may be able to ingest data from various different sources of data (e.g., ingest multiple types/formats of data from multiple types and/or brands of sensors). The data science system 110 may provide a cloud-based infrastructure (e.g., computing resources 120 and/or storage resources 130) that may be tailored/customized for the development of AV models (e.g., ML models, statistical models, rule-based models, etc.). The data science system 110 may support the various workflows, processes, operations, actions, tasks, etc., in the development cycle for AV models. The development cycle for an AV model may be referred to as a loop, a development loop, a big loop, a development process, etc. The development cycle may include the ingestion of data from the vehicles 140. The data may be selected, processed, cleaned, analyzed, annotated, visualized (e.g., viewed), as discussed in more detail below. Computational resources 120 and storage resources 130 may be allocated to develop AV models using the data and/or to store modifications to the data. The AV models may be deployed in the vehicles for testing (e.g., using shadow mode as discussed in more detail below) and additional data may be collected. Other models (e.g., driver assistant models, semi-autonomous neural network models, etc., may also be deployed in the vehicles for testing (e.g., a driver assistant model may also be run in shadow mode). The additional data may be ingested by the data science system 110 and may be used to develop further AV models or update/improve existing AV models, restarting the development cycle.

In one embodiment, data (e.g., sensor data such as CAN data, images, videos, GPS data, LIDAR data, speed, acceleration, etc.) may be received, collected, ingested, etc., from vehicles 140 (e.g., a fleet of vehicles). The data may be processed, cleaned, formatted, scrubbed, massaged, for further feature labelling, annotation, extraction, manipulation, and/or processing. Users (e.g., data scientists and/or data engineers) may be use the data science system 110 to explore the data (e.g., using a data explorer or data visualizer to search for certain types of data, metadata, annotations, etc.) and to create, test, update, and/or modify various AV models.

In one embodiment, the data science system 110 may allow users the flexibility to use and/or modify the data as needed. For example, a user may modify a copy of a set of sensor data and may use the modified set of sensor data to train one or more AV models. The trained (e.g., resulting AV model) and/or the modified set of sensor data may be stored using a version control system so that the AV model and/or the data (e.g., the modified or processed data) used to train the AV model may be used or verified at a later time (e.g., to reproduce the training of the AV model).

In one embodiment, the data science system 110 may enable end-to-end development and/or testing of AV models and/or other AV functions. The data science system 110 may streamline, simplify, and/or automate (e.g., fully automate or at least partially automate) various tasks related to the development and/or testing of AV models. For example, the data science system 110 may streamline and/or automate data ingestion, data preparation, data exploration and visualization, model development, testing, training, and deployment. The data science system 110 may allow for a faster and/or more efficient development cycle (e.g., AV model or application development cycle), as discussed in more detail below. The data science system 110 may also allow AV models (e.g., AV models that have been updated, modified, etc.) to be tested in the vehicles 140 safely (e.g., shadow mode, as discuss in more detail below). This allows the data science system 110 to test new AV models using real/live data from vehicles 140 without affecting the operation of the vehicles 140 (e.g., without endangering passengers).

In one embodiment, the data science system 110 may manage the data ingestion and data storage for the data (e.g., sensor data such as LIDAR data, images, videos, CAN data, log files, traces, etc.) generated by the vehicles 140. The data science system 110 may prepare and/or pre-process the data (e.g., sensor data) that is received from the vehicles 140. For example, the data science system 110 may format the data (e.g., convert the data from one format to another). In another example, the data science system 110 may clean the data (e.g., may remove portions of the data that are not used, may convert units of measurement, etc.). The data may be prepared and/or pre-processed when the data is ingested or received by the data science system 110. In addition, a modified version of the data may also be generated when the data is ingested to allow for playback and/or viewing of the data, as discussed in more detail below. Preparing/pro-processing the data and/or generating the modified data (for playback/viewing) at ingestion may allow a multitude of users and/or AV models to leverage the time and computational resources used to prepare/pre-process the data. The original data (e.g., raw data) that was received from the vehicles 140 is also stored to maintain the original data.

In one embodiment, the data science system 110 may manage the allocation and/or use of computing resources 120 (e.g., computing clusters, server computers, VMs, containers, etc.). The computing resources 120 may be used for data transformation, feature extraction, development and testing of AV models, etc. The computing resources 120 may use various cloud service platforms (e.g., cloud computing resources).

In one embodiment, the data science system 110 may also manage the allocation and/or use of storage resources 130. The storage resources 130 may store different versions of data (e.g., different versions of sensor data) and/or different version of AV models. The different versions of data may be used to train the different versions of AV models. The data science system 110 may maintain and manage the different versions of AV models and the different versions of data used to train the AV models. This may allow a user to develop a new AV model using a previous version of data (e.g., a previous set of training data) and may allow a user to track the development of the AV model and reproduce the development/testing of the AV model.

In one embodiment, the data science system 110 may also allow a user to explore, visualize, and/or view sensor data. The data science system 110 may provide a user interface (e.g., a graphical user interface) which allows a user to stream, playback, and/or view multiple streams of sensor data simultaneously. For example, the user interface may allow a user to view videos from multiple cameras (e.g., streams of video data), view LIDAR data from one or more LIDAR sensors (e.g., streams of LIDAR data), the location of a vehicle 140 (e.g., streams of GPS data or a map) and view the speed/acceleration of the vehicle 140 (e.g., a stream of odometer data). The data science system 110 may generate the sensor data by downsampling without removing outliers or corner cases in the downsampled sensor data. This allows the data science system 110 to generate a smaller data stream to allow users to playback the data, but still allow users to see when outliers, variations, or corner cases occur in the downsampled sensor data. The data science system 110 may allow the user to zoom in or zoom out on a particular stream of data (e.g., view more samples of data per second in a stream of time series data), fast-forward or rewind a data stream, and download frames or images from specific cameras etc. The different streams of sensor data may be synchronized in time to allow the user to comprehensively visualize the state and/or operation of a vehicle 140 at different points in time.

The data science system 110 may also allow users to update, modify, improve, augment, enhance, etc., the data (e.g., sensor data) received from the vehicles 140. For example, the data science system 110 may allow users to add metadata (e.g., labels, descriptions, annotations, tags, identifiers, text, and/or other information) to the data received from the vehicle 140. In one embodiment, the data science system 110 may analyze the data to create and/or add the metadata (e.g., may automatically analyze video data to identify objects, such as trees, in the video data). In another embodiment, the data science system 110 may a third part service, application, process, etc., for generating metadata. The metadata may be time based metadata. For example, the metadata may be associated with a portion of a time period in a stream of data (e.g., in a ten second portion of video data, time series data).

In one embodiment, the data science system 110 may deploy an AV model to vehicles 140 to test the AV model (e.g., to perform experiments using the AV model). The AV model that is deployed for testing may be referred to as a test AV model. The test AV model may be a newer, updated, modified version of an existing AV model. The existing AV model may be an AV model that is currently approved for use in the vehicles 140 (e.g., an AV model that has already been test and approved). The existing AV model may be referred to as a production AV model. The test AV model may operate in parallel with the existing AV model on a vehicle 140, however, the test AV model may not be able to control and/or influence the operation of the vehicle 140. This may be referred to as running the test AV model in shadow mode, allowing the test AV model to shadow the production AV model, etc. This may allow the test AV model to receive live data (e.g., live sensor data as the vehicle 140 moves through an environment) and generate predictions, inferences, decisions, etc., based on the live data.

When a test AV model is operation in shadow mode, the vehicle 140 (e.g., a computing device, a processing device, etc., on the vehicle 140) may monitor the output of the test AV model (e.g., the decisions, inferences, predictions, actions, etc., generated by the test AV model). The vehicle 140 may determine whether the output of the test AV model deviates from a reference output (e.g., a reference decision, inference, prediction, action, etc.). For example, the vehicle 140 may determine whether the output of the test AV model deviates from a reference output by more than a threshold. If the output of the test AV model deviates from the reference output by more than the threshold, the vehicle 140 may save the sensor for a period of time before and after the deviation occurred (e.g., for thirty seconds before and thirty seconds after the deviation occurred).

In one embodiment, the vehicle 140 may use the behavior, actions, etc., of a driver of the vehicle 140 to determine whether the output of the test AV model deviates from reference (e.g., the driver of the vehicle 140 is the reference). For example, if the test AV model determines that the vehicle 140 should turn left by ten degrees and the user turns the vehicle 140 to the left by thirty degrees, the vehicle 140 may determine that the test AV model (e.g., the output of the test AV model) has deviated from the user (e.g., the reference). In another embodiment, the vehicle 140 may use the output of the production AV model to determine whether the output of the test AV model deviates from reference (e.g., the production AV model is the reference).

In one embodiment, users (e.g., data scientists/engineers) may analyze the outputs/results of AV models and/or the data ingested by the data storage system 110. The users may determine that certain types, categories, classes, etc., of data are needed for the development and/or improvement of one or more AV models. For example, the user may determine that additional videos of driving through snowy weather are needed to refine or improve an AV model. The user may provide a request to the data science system 110 for the additional videos of driving through snowy weather. The data science system 110 may forward the request to the vehicles 140. The drivers of the vehicle 140 may collect the requested videos the videos may be provided to the data science system 110. The data science system 110 may ingest, process, and enhance the data, as discussed above. After the new videos have been ingested, the user may be notified that the requested videos (e.g., new or additional sensor data) are now available for use (e.g., viewing, selection, augmentation, etc.). The user can re-train their AV model and/or perform additional experiments using the AV model and the requested videos.

As discussed above, the data science system 110 provides various functions, operations, capabilities, etc., that may be useful during the development of AV models. The data science system 110 provides an end-to-end platform for the development of AV models, starting from data ingestion all the way through testing. The data science system 110 also provides for storage and visualization of heterogeneous data (e.g., different types of sensor data). The data science system 110 allows users to organize, transform, and augment sensor data. The data science system 110 also allows users to save different versions of data so that the testing and development of the AV models can be tracked or correlated with the different version of data (e.g., which versions of data were used to train and/or test which versions of AV models). The data science system 110 also allows users to provision computational and storage resources that include custom-integrated development environments, software or tools. The single data science system 110 may streamline the development process/cycle for AV models by automating various tasks (e.g., processing or augmenting data) and seamlessly integrating the different tools, services, processes that are used at different parts of the development cycle.

Figure 2:
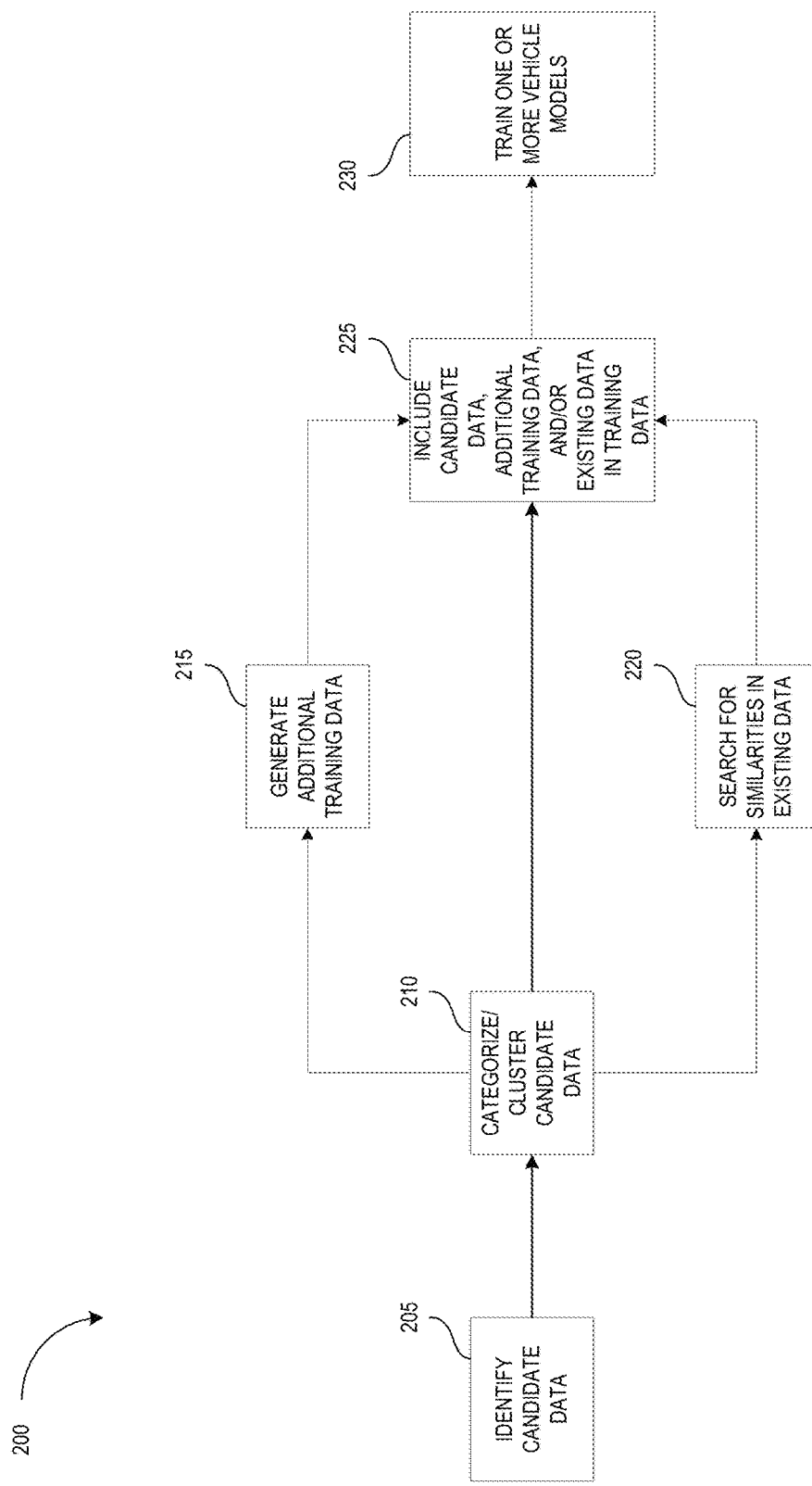
FIG. 2 is a flow diagram of a process for analyzing and categorizing sensor data, in accordance with one or more embodiments of the present disclosure

FIG. 2 is a flow diagram of a process for collecting and categorizing data, in accordance with one or more embodiments of the present disclosure. Process 200 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 200 may be performed by a data science system, components/parts of the data science system, one or more computing devices (e.g., one or more server computers), etc.

The process 200 begins at block 205 where the process 200 identify candidate data. For example, the process 200 may analyze sensor data to identify candidate data. In one embodiment, the candidate data may be identified by a vehicle. For example, a data collection module within the vehicle may analyze sensor data and may identify candidate data based on the sensor data (e.g., may identify a subset of the sensor data as the candidate data). In another embodiment, the candidate data may be identified by one or more computing devices. For example, the candidate data may be identified by a portion, component, sub-subsystem, module, etc., of a data science system. In another example, the candidate data may be identified by one or more computing devices that are separate from the data science system. The methods, operations, actions, techniques, etc., for identifying candidate data are discussed in more detail below. The candidate data may be data that may be used to train, validate, and/or test neural network models. For example, after a neural network is trained using training data (e.g., a first set of data), the neural network model may be validated/tested using testing/validation data (e.g., a second set of data). The candidate data identified, selected, obtained, etc., by the data collection module 1460 may be used as training data and/or testing/validation data.

At block 210, the candidate data may be categorized and/or clustered by the process 200. For example, the candidate data may be processed, analyzed, examined, etc., to determine whether the candidate data may be associated with different categories and/or types of training data, as discussed in more detail below. In another example, a new category and/or type may be created if it is determined that there is no pre-existing category/type for a scenario, situation, etc., indicated (e.g., represented, depicted, etc.) by the candidate training.

At block 215, the process 200 may optionally generate additional training data based on the candidate data. For example, the process 200 may use a generative adversarial network (GAN) to generate additional training data based on the candidate data, as discussed in more detail below. At block 220, the process 200 may optionally search for similarities in other existing data. For example, there may be existing sensor/training data that has not been categorized and/or analyzed by the data science system. The process 200 may use a Siamese neural network to analyze/process the existing data (e.g., existing sensor data that has not yet been categorized) to determine whether the existing data is similar to the candidate data. For example, the process 200 provide both the existing data and the candidate data to the Siamese neural network to determine whether the existing data indicates a situation, scenario, condition, etc., that is similar to the candidate data.

At block 225, the process 200 may include one or more of the candidate data, the existing data (identified in block 220), and the additional training data (generated in block 215) to the set of training data that may be used to train neural network models. For example, additional training data that is created using a generative adversarial network may be added to the training data. In another example, existing data that was previously categorized may be added to the training data and/or associated with a new category/type. In different embodiments the process 200 may perform any combination of blocks 215, 220, and 225. For example, the process 200 may perform blocks 215 and 225, blocks 220 and 225, etc. In some embodiments, the blocks 215 and 220 may be performed sequentially and/or in parallel. For example, blocks 215 and 220 may be performed in parallel. In another example, blocks 215 and 220 may be performed sequentially (e.g., block 215 first and then block 220, or vice versa). At block 230, one or more neural network models may be trained using one or more of the candidate data, the additional training data, and the existing training data.

Figure 3:
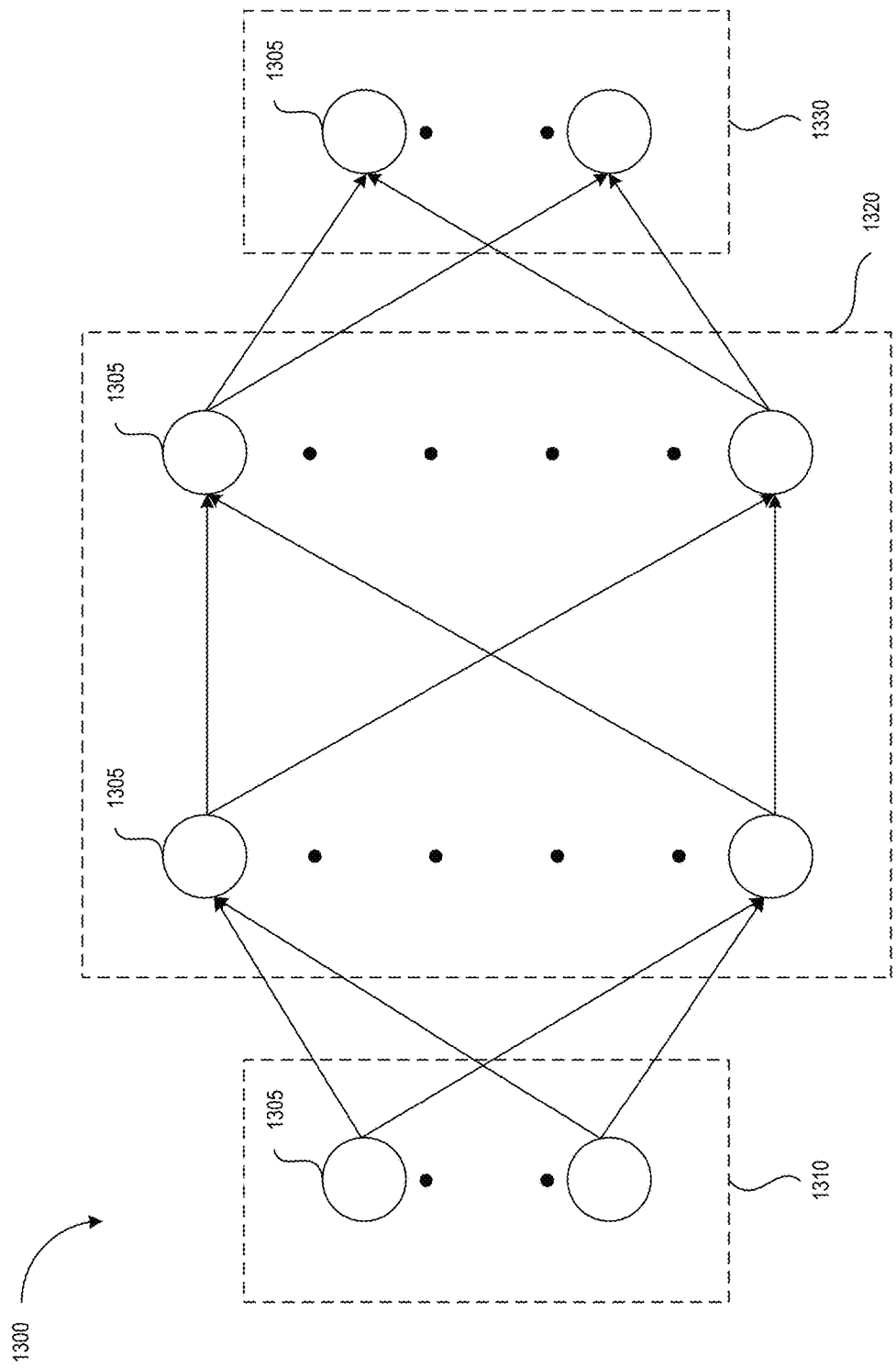
FIG. 3 is a diagram illustrating an example neural network, in accordance with one or more embodiments of the present disclosure.

FIG. 3 is a diagram illustrating an example neural network 1300, in accordance with one or more embodiments of the present disclosure. The neural network 1300 may be an example of a machine learning model (e.g., a neural network model, an autonomous vehicle model, a driver assistant model, etc.). The neural network model 1300 may be used to model relationships between (e.g., complex) inputs and outputs or to find patterns in data, where the dependency between the inputs and the outputs may not be easily ascertained. The neural network model 1300 may also be a computing model that may be used to determine a feature in input data through various computations. For example, the neural network model 1300 may determine a feature (e.g., a number, shape, pattern, etc.) in input data (e.g., audio data, image data, video data, etc.) according to a structure that defines a sequence of computations to be performed. The neural network 1300 may also generate an output (e.g., an inference, a decision, etc.) based on the input data. For example, the neural network model 1300 may generate/determine a bounding box around an object in an image/video, or may generate/determine a path/trajectory for a vehicle. The neural network model 1300 may also be referred to as a neural network. In some embodiments, the neural network model 1300 may be a supervised neural network model (e.g., a supervised neural network). In other embodiments, e neural network model 1300 may be an unsupervised neural network model (e.g., an unsupervised neural network).

The neural network model 1300 may be a convolutional neural network (CNN). A CNN may be a feed forward neural network model where the connections between the nodes do not form a cycle (e.g., connections do not go backwards). The signals, messages, data, information etc., may not go backwards through the neural network model (e.g., may not go from right to left). The neural network model 1300 includes an input layer 1310, a hidden layer 1320, and an output layer 130. Each of the input layer 1310, the hidden layer 1320, and the output layer 130 includes one or more nodes 1305. Each of the input layer 1310, the hidden layer 1320, and the output layer 130 may have a different number of nodes 1305. The neural network model 1300 may be a deep neural network model or a deep CNN. A neural network model may be deep if the hidden layer 1320 includes multiple levels (e.g., multiple sub-layers of nodes 1305). Each of the nodes 1305 in a layer is connected to another node 1305 in the neural network model 1300.

Each connection may be associated with a weight or weight value (e.g., may have a weight). A weight or weight value may define coefficients applied to the computations. For example, the weights or weight values may be scaling factors between two or more nodes 1305. Each node 1305 may represent a summation of its inputs, and the weight or weight value associated with a connection may represent a coefficient or a scaling factor multiplied to an output of a node 1305 in that connection. The weights between the nodes 1305 may be determined, calculated, generated, assigned, learned, etc., during a training process for the neural network model. Thus, the weights of the hidden layers can be considered as an encoding of meaningful patterns in the data. The weights of the connections between the nodes 1305 may be modified by additional training.

Although neural network model 1300 is depicted with a particular number of nodes 1305, layers, and connections, various neural network model architectures/configurations may be used in other embodiments. For example, different fully connected neural network models and partially connected neural network models (e.g., where all nodes in adjacent layers are not connected) may be used. In addition, some layers may be fully connected (e.g., output layer 1330 may be a fully connected layer that includes multiple layers of nodes and the layers of nodes may be fully connected) while other layers may not be fully connected. Furthermore, other types of neural network models may also be used. For example, a recurrent neural network (RNN) may be used. A RNN may be a neural network model that allows connections between nodes to form a cycle and/or may go in a backwards direction.

Figure 4A:
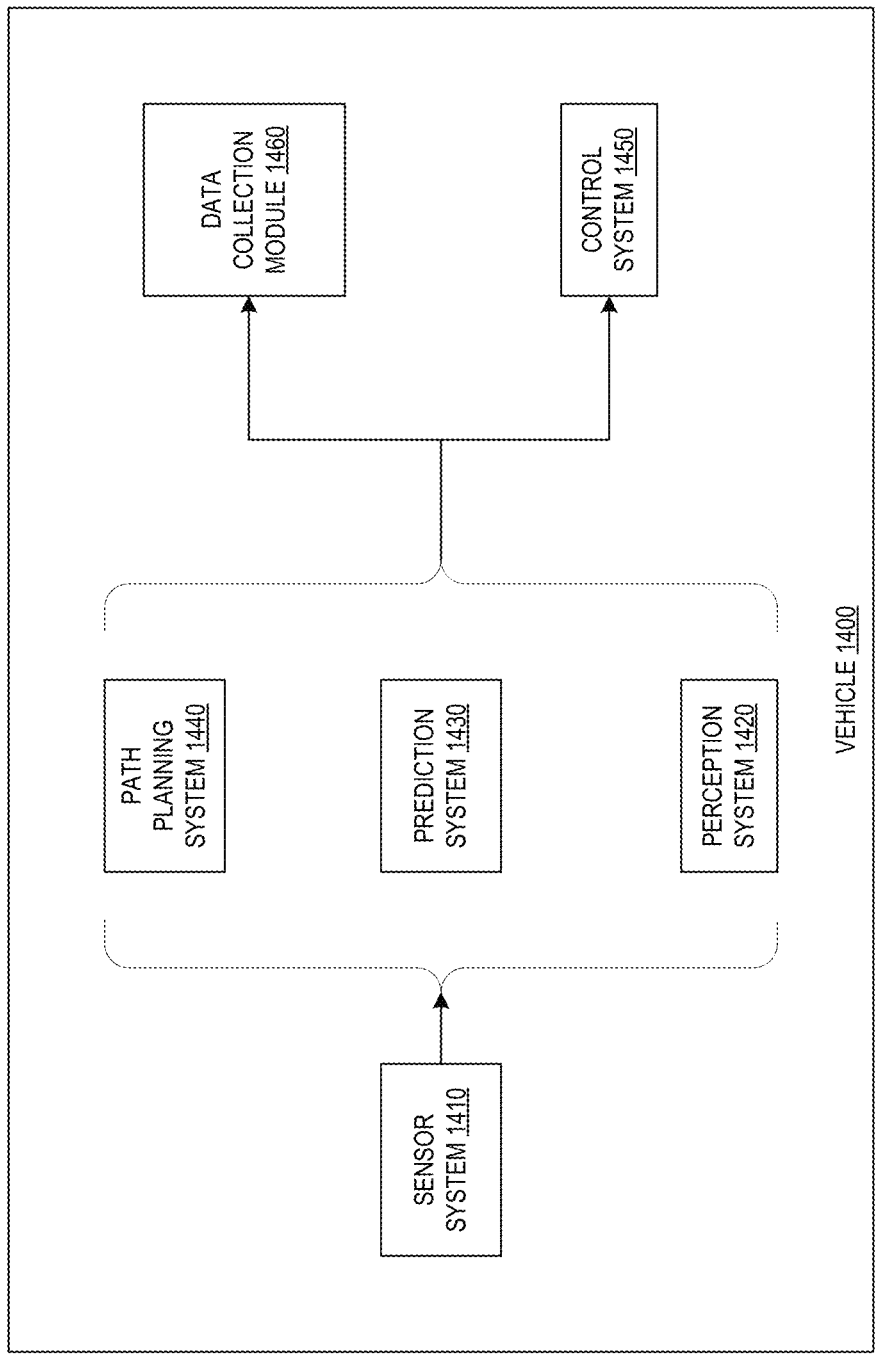
FIG. 4A is a block diagram that illustrates an example vehicle, in accordance with one or more embodiments of the present disclosure.

FIG. 4A is a block diagram that illustrates an example vehicle 1400, in accordance with one or more embodiments of the present disclosure. In one embodiment, the vehicle 1400 may be an autonomous vehicle (e.g., a self-driving vehicle). For example, the vehicle 1400 may be a vehicle (e.g., car, truck, van, mini-van, semi-truck, taxi, drone, etc.) that may be capable of operating autonomously without intervention from and/or interaction with a user (e.g., an operator of the vehicle 1400, a driver of the vehicle 1400, etc.). In another embodiment, the vehicle 1400 may also be a vehicle with autonomous capabilities. A vehicle 1400 vehicle with autonomous capabilities may be a vehicle that may be capable of performing some operations, actions, functions, etc., autonomously. For example, vehicle 1400 may have adaptive cruise control capabilities and/or lane assist/keep capabilities. A vehicle 1400 with autonomous capabilities may be referred to as a semi-autonomous vehicle. The vehicle 1400 may include various systems that allow the vehicle 1400 to operate autonomously and/or semi-autonomously. For example, vehicle 1400 includes a sensor system 1410, a perception system 1420, a prediction system 1430, a path planning system 1440, a control system 1450, and a data collection module 1460.

The sensor system 1410 may include one or more sensors (e.g., detectors, sensing elements, sensor devices, etc.). The one or more sensors may provide information about the operation of the vehicle 1400, information about the condition of the vehicle 1400, information about occupants/users of the vehicle 1400, and/or information about the environment (e.g., a geographical area) where the vehicle 1400 is located. The one or more sensors may be coupled to various types of communication interfaces (e.g., wired interfaces, wireless interfaces, etc.) to provide sensor data to other systems of the vehicle 1400. For example, a sensor may be coupled to a storage device (e.g., a memory, a cache, a buffer, a disk drive, flash memory, etc.) and/or a computing device (e.g., a processor, an ASIC, an FPGA, etc.) via a control area network (CAN) bus. In another example, a sensor may be coupled to a storage drive and/or a computing device via Bluetooth, Wi-Fi, etc. Examples of sensors may include a camera, a radar sensor, a LIDAR sensor, etc.

The perception system 1420 may include hardware, software, firmware, or a combination thereof that may process, analyze, and/or interpret the sensor data generated by the sensors of the sensor system 1410. The perception system 1420 may include one or more neural network models (e.g., machine learning models, neural networks, etc.) that may detect objects and/or conditions of the environment where the vehicle 1400 is located. For example, the one or more neural network models may detect pedestrians, other vehicles (e.g., other cars, trucks motorcycles), traffic signs, weather conditions (e.g., rain, snow, etc.), driving conditions (e.g., time of day, type of road, such dirt, asphalt, concrete, etc.). The one or more neural network models of the perception system 1420 may generate output that may indicate the objects and/or conditions of the environment that are detected/identified by the one or more neural network models. This output may be provided to the prediction system 1430 and/or the data collection module 1460.

The prediction system 1430 may include hardware, software, firmware, or a combination thereof that may process, analyze, and/or interpret the sensor data generated by the sensors of the sensor system 1410 and/or the outputs of the perception system 1420 (e.g., the objects and/or conditions detected by the perception system 1420). The prediction system 1430 may determine and/or estimate the predicted behavior or path for various objects in the environment where the vehicle 1400 is located. For example, based on the sensor data and/or the outputs of the perception system 1420, the prediction system 1430 may estimate, predicate, calculate, determined, etc., a path for another vehicle that is located on the same road as the vehicle 1400. In another example, the prediction system 1430 may detect the path for a pedestrian walking in the environment where the vehicle 1400 is located. One or more neural network models of the prediction system 1430 may generate output that may indicate the estimated and/or predicted behavior/path of the objects. This output may be provided to the path planning system 1440 and/or the data collection module 1460.

The path planning system 1440 may include hardware, software, firmware, or a combination thereof that may process, analyze, and/or interpret the sensor data generated by the sensors of the sensor system 1410 and/or the outputs of the prediction system 1430 (e.g., the predicted paths/behaviors). The path planning system 1440 may determine a path through the environment where the vehicle 1400 is located/travelling based on the objects detected and the predicted path/behavior of the objects. For example, the path planning system 1440 may generate a path along a road that avoids one or more obstacles (e.g., other vehicles) on the road. One or more neural network models of the path planning system 1440 may generate output indicating the path for the vehicle 1400 through the environment. This output may be provided to the control system 1450 and/or the data collection module 1460.

The control system 1450 may include may include hardware, software, firmware, or a combination thereof that may control the functions, operations, actions, etc., of the vehicle 1400. For example, the control system 1450 may be able to control a braking system and/or an engine to control the speed and/or acceleration of the vehicle 1400. In another example, the control system 1450 may be able to control a steering system to turn the vehicle 1400 left or right. In a further example, the control system 1450 may be able to control the headlights or an all-wheel drive (AWD) system of the vehicle 1400 based on weather/driving conditions (e.g., if the environment has snow/rain, if it is night time in the environment, etc.). The control system 1450 may use sensor data and/or outputs generated by neural network models of one or more of the path planning system 1440, the prediction system 1430 and the perception system 1420 to control the vehicle 1400.

As discussed above the vehicle 1400 (e.g., the systems illustrated in FIG. 4A) may include multiple neural network models for various functions, operations, actions, purposes. These neural network models may be able to control the function, operation, or actions of the vehicle 1400 and may be referred to as reference/production neural network models. The vehicle 1400 (e.g., the systems illustrated in FIG. 4A) may also include other neural network models that execute in parallel with the reference/production neural network models. The other neural network models may not be able to control the function, operation, or actions of the vehicle 1400. For example, the other neural network models may be executing in shadow mode. The other neural network models (which are executing in shadow mode) may be referred to as test neural network models.

The data collection module 1460 may determine whether sensor data generated by the sensors of the sensor system 1410 includes candidate data. The candidate data may be data that may indicate a situation, scenario, circumstance, etc., that may be useful in training other neural network models (e.g., corner cases). For example, the candidate data (e.g., sensor data) may indicate an unfamiliar/unknown object, an unfamiliar/unknown traffic control device (e.g., an unknown road sign, a lane marker with an unexpected color), unfamiliar/unknown weather conditions (e.g., both hail and snow at the same time), unexpected behavior from an object (e.g., unexpected behavior from a vehicle), an unfamiliar/unknown object (e.g., a three-wheel motorcycle), etc. The candidate may include data that causes one or more neural network models to have errors, to generate incorrect/improper output, etc. The candidate data may also be data that may be used to validate and/or test neural network models. For example, after a neural network is trained using training data (e.g., a first set of data), the neural network model may be tested using testing/validation data (e.g., a second set of data). The candidate data identified, selected, obtained, etc., by the data collection module 1460 may be used as training data and/or testing/validation data. For example, the same candidate data may be used as both training data and testing/validation data. In another example, a first set of candidate data may be used as training data and a second set of candidate data may be used as testing/validation data.

In some embodiments, sensor data may also refer to data that is not generated by a sensor. For example, sensor data may include outputs generated by a neural network model (e.g., a machine learning model). A neural network model may generate a list of objects that are detected in an image. This list of objects may be an example of sensor data. Sensor data may refer to data that is generated by the vehicle 1400 (e.g., generated by sensors of the vehicle, neural network models of the vehicle, and/or other components of the vehicle). The sensor data may indicate information about the state, condition, and/or operation of the vehicle 1400. The sensor data may also indicate information about the environment where the vehicle 1400 is located.

The candidate data may be useful in training and/or testing other neural network models (e.g., other existing neural network models or future neural network models). If the data collection module 1460 determines that the sensor data includes candidate data, the data collection module 1460 may provide a subset of the sensor data to a computing device (e.g., a server, a cluster of servers, etc.). The data collection module 1460 may identify or determine the subset of sensor data based on the time when a situation, scenario, etc., occurred and/or based on the time when the sensor data resulted in errors or incorrect output from a neural network model. For example, if a situation or scenario occurred at time T, the data collection module 1460 includes sensor data from a period of time before time T (e.g., 15 seconds before, 45 second before, or some other appropriate time period) through a period of time after time T (e.g., one minute after, twenty second after, or some other appropriate time period) in the subset of the sensor data. The data collection module 1460 may also identifier different types of sensor data. For example, if a neural network model for object detection has errors, the data collection module 1460 may include video data in the subset (but may not include other sensor data such as engine temperature). The subset of sensor data may be transmitted (e.g., provided) to a computing device via a network (e.g., via a wireless network, a cellular network, etc.). The subset of sensor data may also be transmitted to a computing device via a direct connection to the computing device (e.g., via one or more physical cables).

In one embodiment, the data collection module 1460 may store the subset of the sensor data in a memory (e.g., a non-volatile memory, such as a flash drive). The remaining portion of the sensor data may be discarded. For example, the remaining portion of the sensor data may be deleted. In another example, the remaining portion of the sensor data may be stored in a memory until the remaining portion of the sensor data is overwritten with new sensor data. For example, a circular buffer/memory may be used to store sensor data. The oldest sensor data in the circular buffer/memory may be erase and/or overwritten as new sensor data is written to the circular buffer/memory.

In one embodiment, the data collection module 1460 may determine whether the sensor data comprises candidate data by determining whether the set of outputs generated by the set of neural network models deviate from a set of expected outputs. For example, the data collection module 1460 may determine whether an output generated by a neural network model (e.g., a neural network model executing in shadow mode, a neural network model that is unable to control the vehicle 1400) deviates from an expected output. The expected output may be an output generated by a reference or production neural network model that is able to control the vehicle 1400. For example, the data collection module 1460 may determine whether a path generated by a neural network model (e.g., a test neural network model) deviates from a path generated by the neural network model which controls the vehicle 1400. The data collection module 1460 may also use a threshold deviation to determine whether the output deviates from an expected output. For example, the data collection module 1460 may determine that an output deviates from an expected output if the output differs by a threshold distance, a threshold percentage, a threshold angle, a threshold speed, etc.

In one embodiment, the data collection module 1460 may use a Bayesian model to determine whether the sensor data comprises candidate data. For example, the test model (and/or the production model) may be a Bayesian model (e.g., a Bayesian neural network). A Bayesian model may generate an output and may also generate a uncertainty metric (e.g., an uncertainty level, an uncertainty value, etc.)

for the output. The uncertainty metric may be a value (e.g., a number, a percentage, etc.) that may represent how uncertain the Bayesian model is about the output/result generated by the Bayesian model. The data collection module 1460 may determine that the sensor data comprises candidate data if the uncertainty metric is exceeds a threshold or is below the threshold, based on whether a higher value represents more or less uncertainty.

In one embodiment, different versions of a base neural network model may be executed in parallel. Each version of the base neural network model may include a subset of the nodes and/or connections of the base neural network model. The data collection module 1460 may determine that sensor data includes candidate data when the different version of the base neural network model generate different outputs, as discussed in more detail below.

In one embodiment, the data collection module 1460 may include one or more additional machine learning models (e.g., one or more neural networks) that may analyze the outputs of the test neural network models and/or the production/reference neural network models to determine whether the sensor data that was analyzed by the test neural network models and/or the production/reference neural network models include candidate data. The one or more additional machine learning models may be referred to as candidate neural network models. For example, a support vector machine (e.g., 1-class support vector machine) may analyze the outputs of the test/production neural network models and/or may analyze intermediate outputs between different layers of a neural network model to determine whether the sensor data includes candidate data (e.g., scenarios, situations, objects, etc., that have not previously been encountered). For example, each layer of a neural network model (e.g., a neural network) may provide outputs (e.g., intermediate output) to the next layer of the neural network model. The support vector machine may analyze the intermediate outputs to determine whether the sensor data includes candidate data. The candidate data models may execute in parallel with the test/production neural network models to determine when sensor data should be stored and transmitted to a computing device for further analysis.

In one embodiment, the data collection module 1460 may determine whether sensor data includes candidate data based on the outputs of one or more neural network models (e.g., one or more production neural network models). For example, a neural network model may detect objects and predict a path or a behavior of an object (e.g., may detect other vehicles in images/video and may predict path of other vehicles). If the path (e.g., the behavior) of the object deviates from the predicted path, the data collection module 1460 may determine that an interesting scenario, situation, circumstance, etc., has occurred and may determine that the sensor data that was collected includes candidate data that should be analyzed by the data science platform. For example, an unexpected obstacle may have caused the other vehicle to deviate from the expected path. The sensor data that indicates this unexpected obstacle may be candidate data.

In another embodiment, the data collection module 1460 may determine whether sensor data includes candidate data by using a process referred to as scene abstraction. Scene abstraction may refer to the process of generating a 2D and/or 3D representation of an area where the vehicle is located (e.g., a scene of the area or surroundings of the vehicle). The 2D/3D representation may be generated by combining map data along with a localized list of objects perceived, sensed, detected, etc., by the sensors of the vehicle. Scene abstraction may be performed by a partially or fully autonomous vehicle to abstract a scene to various levels of details. Existing modules for scene representation (e.g., existing modules, such as existing neural network modules, that do prediction of other objects) may be used in conjunction with the embodiments of the present disclosure to detect/identify candidate data.

Although the present disclosure may refer to test neural network models or neural network models operating in shadow mode, the embodiments, examples, implementations discussed herein may also be used in conjunction with production/reference neural network models. For example, the data collection module 1460 may determine whether a production/reference neural network model generates an output (e.g., a path) devices from an action/behavior of a user (e.g., the path a driver of the vehicle 1400 took) by more than a threshold (e.g., more than a threshold angle, distance, etc.). If the data collection module 1460 determines that a production/reference neural network model generates an output that deviates by more than a threshold, the data collection module 1460 may identify a subset of the sensor data (provided to the production/reference model) and provide the subset of sensor data to the computing device for further analysis.

Figure 4B:
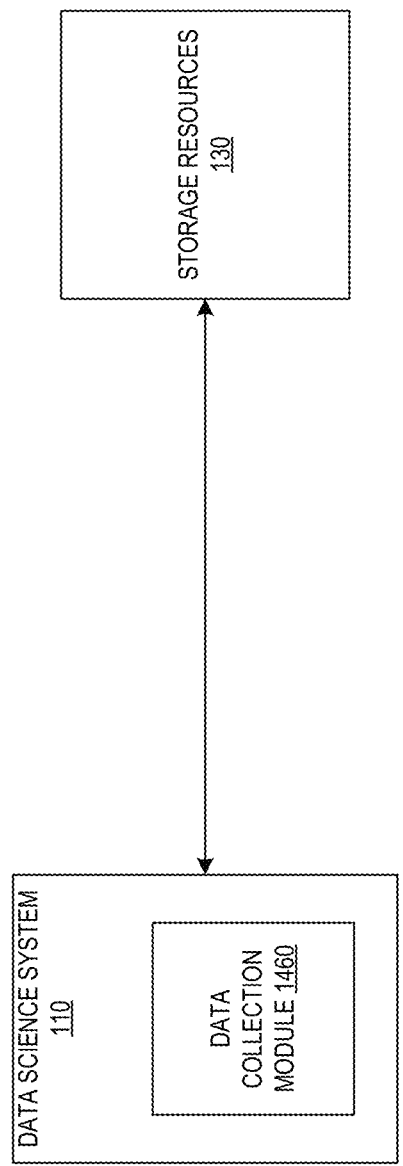
FIG. 4B is a block diagram that illustrates an example data science system, in accordance with one or more embodiments of the present disclosure.

FIG. 4B is a block diagram that illustrates an example data science system 110, in accordance with one or more embodiments of the present disclosure. The data science system 110 includes a data collection module 1460, similar to the data collection module 1460 illustrated in FIG. 4A. The data science system 110 is coupled to storage resources 130. The storage resources 130 may include various different types of storage devices, such as hard disk drives (HDDs), solid state drives, hybrid drives, storage area networks, storage arrays, etc. The storage resources may store data, such as sensor data generated by various vehicles. The sensor data may have been previously generated by the vehicles. As discussed above, the data science system 110 may enable end-to-end development and/or testing of neural network models and/or other vehicle functions. The data science system 110 may streamline, simplify, and/or automate (e.g., fully automate or at least partially automate) various tasks related to the development and/or testing of neural network models. The data science system 110 may also allow neural network models to be trained and/or tested using training data.

In one embodiment, the data collection module 1460 may determine whether sensor data that is stored on the storage resources 130 includes candidate data. Candidate data may be data that may indicate a situation, scenario, circumstance, etc., that may be useful in training other neural network models, as discussed above. The data collection module 1460 may use various techniques, methods, operations, etc., to identify candidate data, as discussed above in conjunction with FIG. 4A. For example, the data collection module 1460 may determine whether the sensor data comprises candidate data by determining whether the set of outputs generated by the set of neural network models deviate from a set of expected outputs. In another example, the data collection module 1460 may use a Bayesian model to determine whether the sensor data comprises candidate data.

Figure 5:
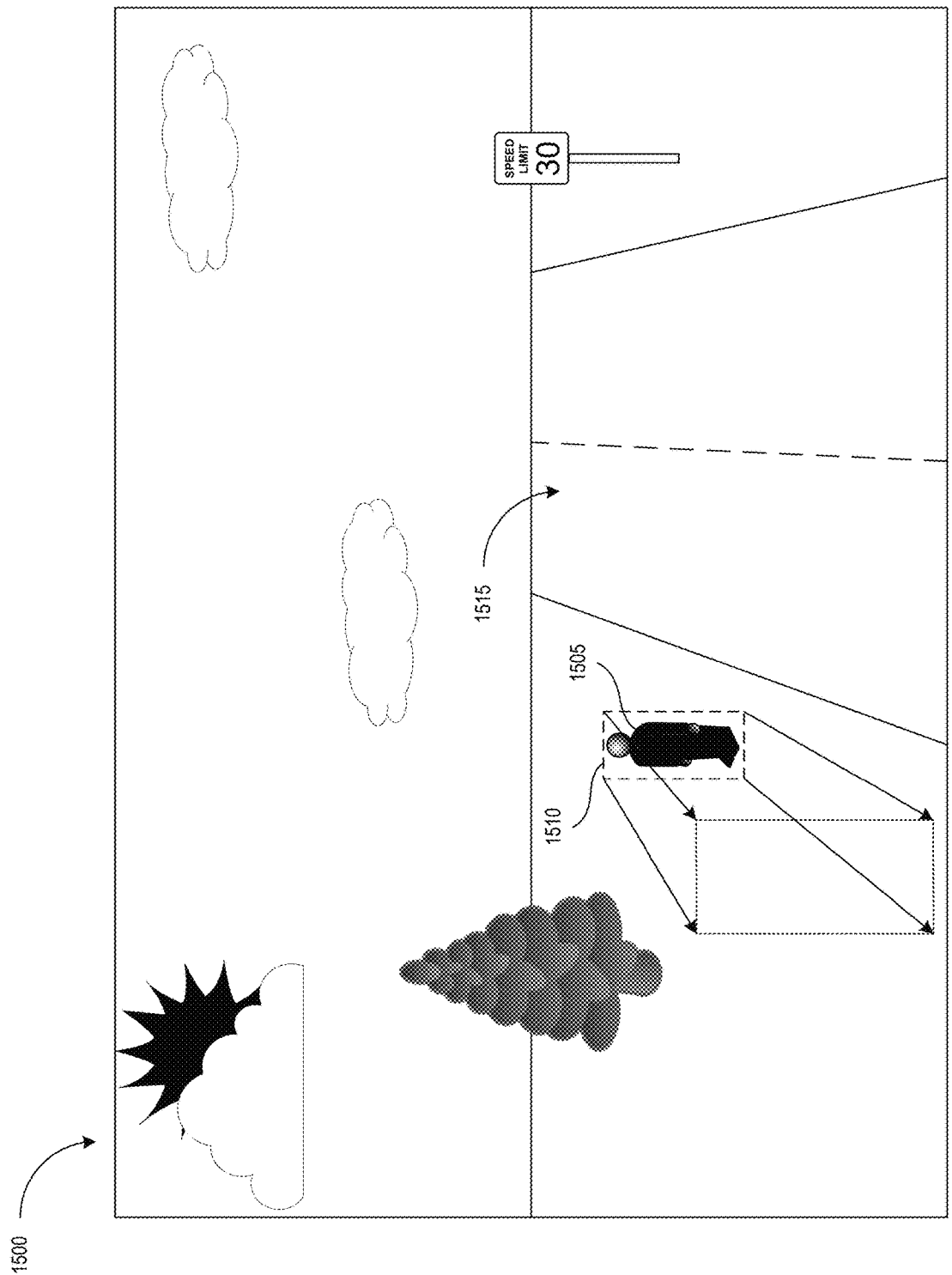
FIG. 5 is a diagram illustrating an example image, in accordance with one or more embodiments of the present disclosure.

FIG. 5 is a diagram illustrating an example image 1500, in accordance with one or more embodiments of the present disclosure. The image 1500 may be an image generated, obtained, captured, etc., by a sensor (e.g., a camera, a video camera, etc.). The image 1500 may depict an environment where a vehicle (e.g., an autonomous vehicle, a semi-autonomous vehicle, etc.) may be located and/or travelling.

The image 1500 may be portion of a video that is generated, obtained, captured, etc., by the sensor. For example, the image 1500 may be a frame of a video that is captured by a video camera.

As discussed above, a perception system of the vehicle may detect objects that are in the image 1500 (e.g., objects that are in the environment/location where the vehicle is located and is depicted in the image 1500). The perception system may include various neural network models (e.g., neural networks) that may detect different objects in the image 1500. For example, the perception system may include one or more neural network models that are not able to control vehicle (e.g., one or more neural network models that are operating in shadow mode). A first neural network model may detect a pedestrian 1505 (e.g., a person) and/or multiple pedestrians within the image 1500. The first neural network model may generate a bounding box 1510 (e.g., the dashed rectangle) around the pedestrian 1505 to indicate the location of the pedestrian 1505 within the image 1500.

The vehicle may be travelling along upwards along the road 1515 (e.g., into FIG. 5) and the image 1500 may be captured while the vehicle is moving. The sensor of the vehicle (e.g., the video camera) may capture additional images as the vehicle continues to travel along the road 1515. In the additional images, the first neural network model may generate additional bounding boxes to indicate the location of the pedestrian 1505 (who may also be depicted in the additional images). The additional bounding boxes should be located along the path indicated by the arrows originating from the bounding box 1510. The bounding box 1510 and/or the additional bounding boxes generated by the first neural network model may be referred to as the outputs generated by the first neural network model.

In one embodiment, a data collection module may determine whether changes in the bounding boxes generated by the first vehicle vary linearly over time. For example, the additional bounding boxes generated by the first neural network model should be located along the path indicated by the arrows originating from the bounding box 1510. If one or locations of the bounding boxes generated by the first machine learning module do not vary linearly over time (e.g., vary from the path illustrated by the arrows), the data collection module may determine that sensor data collected by the vehicle (e.g., sensor data generated by various sensors, which may include the image 1500) should be stored and/or provided to another computing device for analysis.

In one embodiment, if the changes in the output do not vary linearly over time, this may indicate that the first neural network model is unable to process the image 1500 correctly (e.g., is unable to correctly identify the location of the pedestrian 1505). For example, the first neural network model may have a bug or failure that causes the first neural network model to incorrectly identify a pedestrian in an image. In another embodiment, if the changes in the output do not vary linearly over time, this may indicate that a scenario, set of circumstances, situation, etc., has occurred which may be of interest to users who create (e.g., program) neural network models. For example, the sensor data may indicate a scenario, a situation, a circumstance that was has not been encountered before and this may cause problems or errors in other neural network models. It may be useful to store the sensor data (or a subset of the sensor data) so that the sensor data can be used to train and/or test other neural network models (e.g., other version of a neural network model, different neural network models, etc.).

Although FIG. 5 discusses neural network models that generate bounding boxes around pedestrians, detecting when changes in the output of a neural network model exceeds a threshold may be applied to other types of neural network models. For example, the neural network models may generate bounding boxes around other objects, such as traffic control devices (e.g., stop lights, stop signs, speed limit signs, other types of signs, road markers, lane markers, dividers, barriers, speed bumps, pavement markers, rumble strips, etc.), other vehicles, etc.

Figure 6:
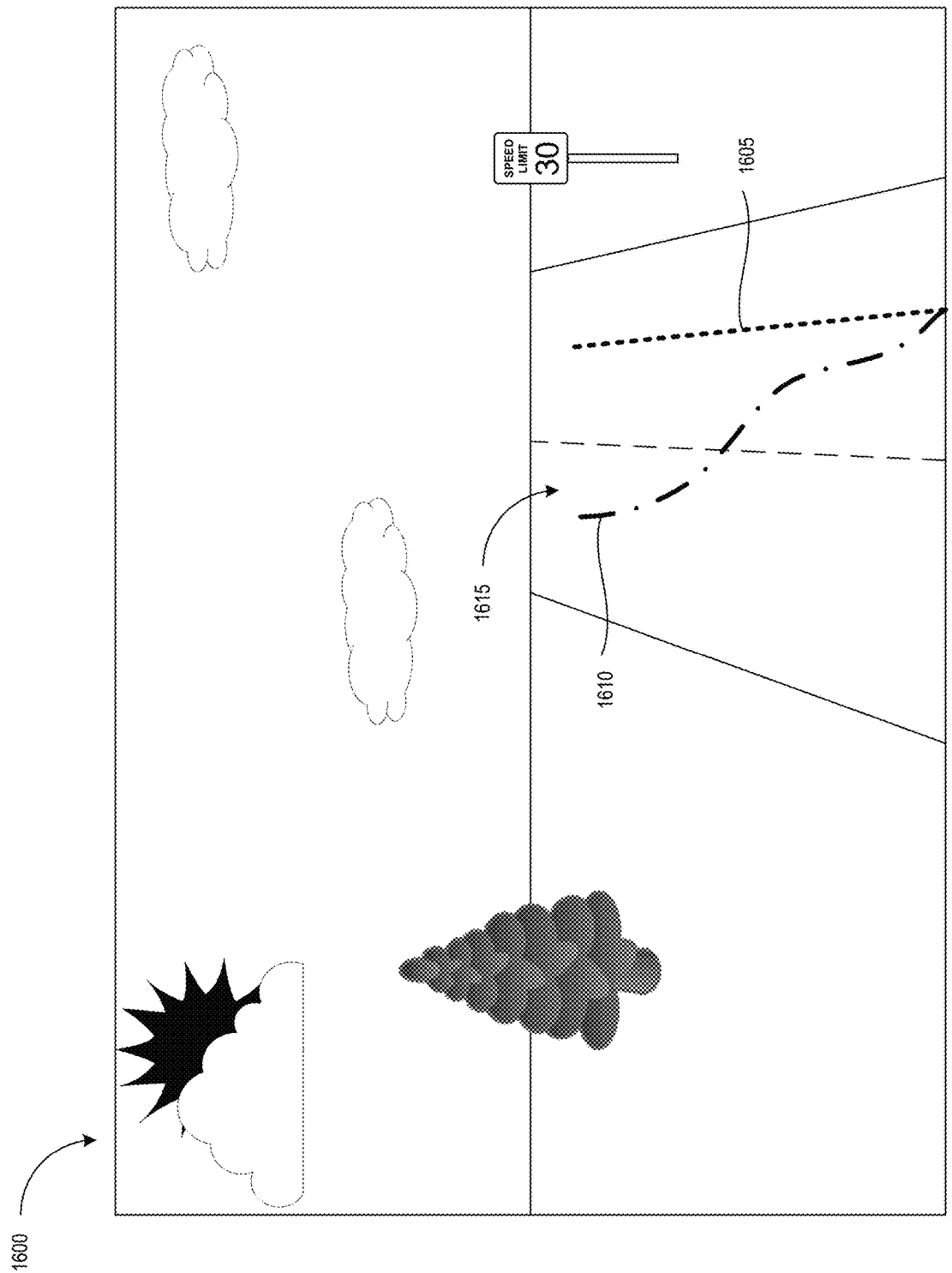
FIG. 6 is a diagram illustrating an example image, in accordance with one or more embodiments of the present disclosure.

FIG. 6 is a diagram illustrating an example image 1600, in accordance with one or more embodiments of the present disclosure. The image 1600 may be an image generated, obtained, captured, etc., by a sensor (e.g., a camera, a video camera, etc.). The image 1600 may depict an environment where a vehicle (e.g., an autonomous vehicle, a semi-autonomous vehicle, etc.) may be located and/or travelling. The image 1600 may be portion of a video that is generated, obtained, captured, etc., by the sensor.

As discussed above, a path planning system of the vehicle may determine, identify, generate, etc., a path for the vehicle based on objects detected by a perception system 1420 and estimated/predicated locations of the objects determined by a prediction system. The path planning system may include various neural network models (e.g., neural networks) that may generate a path for the vehicle and may indicate the path in the image 1600. For example, the path planning system may include one or more neural network models that are not able to control vehicle (e.g., one or more neural network models that are operating in shadow mode). A first neural network model may generate the path 1605 illustrated in FIG. 6 for the vehicle. The first neural network model may generate a line (e.g., the dotted line) to represent the path (e.g., vehicle path) along the road 1615 depicted in the image 1600.

In one embodiment, a data collection module may determine whether the path 1605 generated by the first neural network model (e.g., an output of the first neural network model) deviates from a reference path 1610 (indicated by the dashed and dotted line in FIG. 6). The reference path may be generated by another neural network model of the path planning system (e.g., the reference path may be an output of another neural network model). For example, the reference path may be generated by a reference or production neural network model of the path planning system. The reference or production neural network model may be able to control the operation of the vehicle (e.g., may be able to steer the vehicle along the path 1610). The reference path may also be based on the behavior and/or actions of a user of the vehicle (e.g., the operator, the driver, etc.). For example, path 1610 may be the path that is taken by a driver of the vehicle (e.g., the driver of the vehicle may drive along the path 1610). The reference path may be referred to as an expected output or an expected path.

If the path 1605 deviates from the path 1610 by a threshold (e.g., a threshold distance, a threshold angle, a threshold curvature, etc.) a data collection module may determine that sensor data collected by the vehicle (e.g., sensor data generated by various sensors, which may include the image 1600) should be stored and/or provided to another computing device for analysis. As discussed above, a deviation in the path that exceeds a threshold deviation may indicate that the first neural network model is unable to process the image 1600 correctly (e.g., the first neural network model has a bug and may be unable to generate a proper or correct path for the vehicle in certain conditions, instances, situations, etc.). In another embodiment, a deviation in the path that exceeds a threshold deviation may indicate that a scenario, set of circumstances, situation, etc., has occurred which may be of interest to users who create (e.g., program) neural network models. It may be useful to store the sensor data (or a subset of the sensor data) so that the sensor data can be used to train and/or test other neural network models (e.g., other version of a neural network model, different neural network models, etc.).

Figure 7:
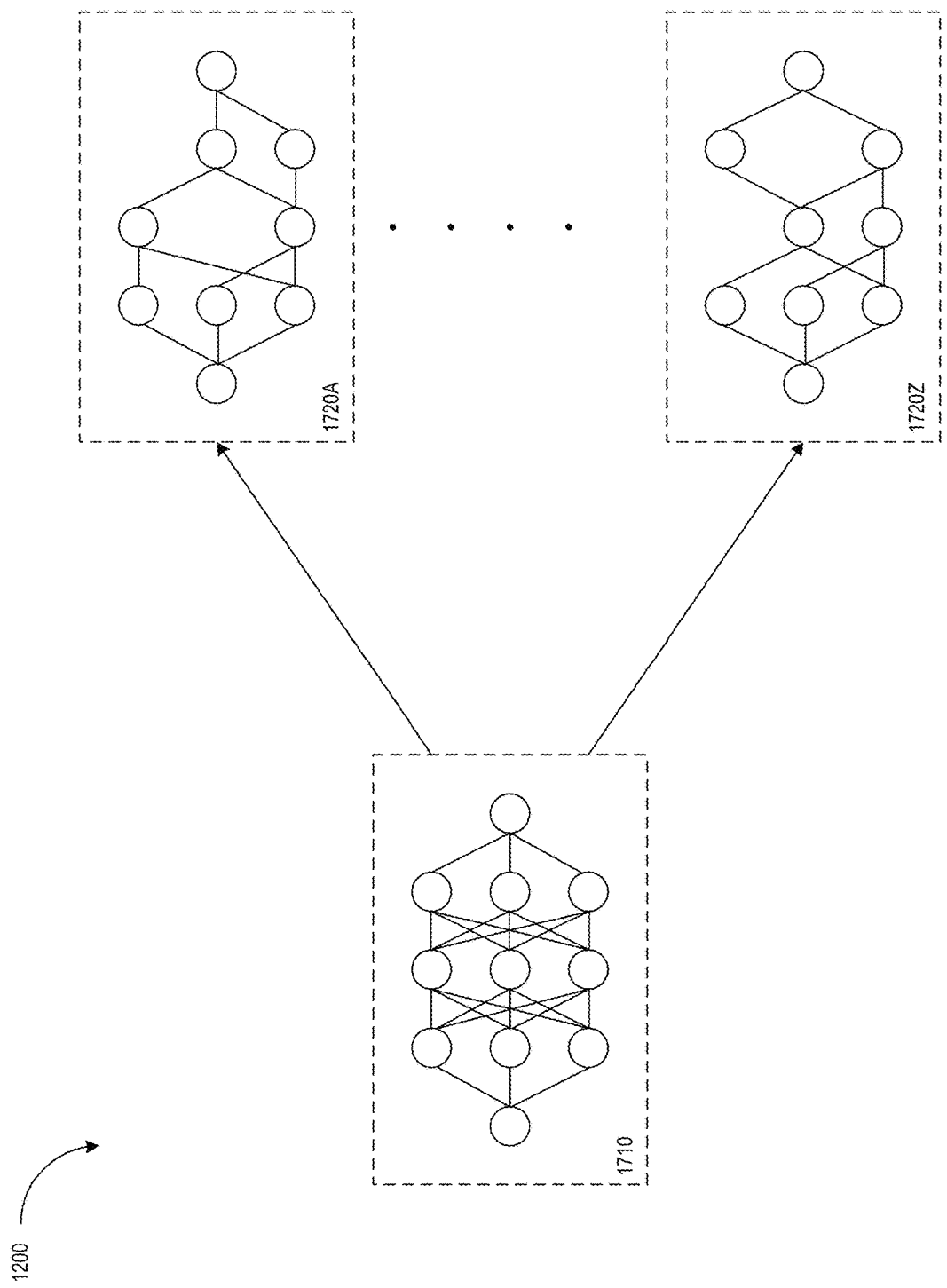
FIG. 7 is a diagram illustrating example neural network models in accordance with one or more embodiments of the present disclosure.

FIG. 7 is a diagram illustrating example neural network models 1710 and 1720A through 1720Z, in accordance with one or more embodiments of the present disclosure. As discussed above, a neural network model may be a neural network that includes various nodes (e.g., layers of nodes such as an input layer, an output layer, *intermedia* layers, fully connector layers, etc.) and various connections between the nodes. Each of the connections may be associated with a weight, as discussed above.

In one embodiment, the neural network models 1720A through 1720Z may be generated, created, etc., based on the neural network model 1710. For example, neural network model 1710 may be referred to as a base neural network model, a base model, etc. The neural network models 1720A through 1720Z may include a subset of the nodes that in the neural network model 1710 (e.g., may include fewer nodes than the neural network model 1710). The neural network models 1720A through 1720Z may also include fewer connections than the neural network model 1710. For example, because some of the nodes that are in the vehicle module 1710 are not in the neural network models 1720A through 1720Z, the connections to the missing nodes are also not in the neural network models 1720A through 1720Z. Nodes may be removed from various layers to generate the neural network models 1720A through 1720Z. For example, nodes may be removed from layers that are closer to the output layers (e.g., higher layers) to create the neural network models 1720A through 1720Z. The neural network models 1720A through 1720Z may be referred to as dropout models. In some embodiments, the neural network model 1710 may be a reference or production neural network model. For example, the neural network model 1710 may be able to control the actions, operations, and/or functions of the vehicle.

In one embodiment, a data collection module may determine whether the one or more outputs generated by the neural network models 1720A through 1720Z, deviate and/or differ from one or more outputs generated by the neural network model 1710. For example, the data collection module may determine whether one or more paths generated by the neural network models 1720A through 1720Z (e.g., one or more outputs of the neural network models 1720A through 1720Z) differ from a path generated by the neural network model 1710 (e.g., an expected output) by a threshold amount. In another example, the data collection module may determine whether one or more bounding boxes (e.g., one or more outputs) generated by the neural network models 1720A through 1720Z differ or deviate from a bounding box generated by the neural network model 1710.

If one or more of the outputs of the neural network models 1720A through 1720Z differ from an expected output of the neural network model 1710 the data collection module may determine that sensor data collected by the vehicle should be stored and/or provided to another computing device for analysis. As discussed above, outputs that differ from the expected output of the neural network model 1710 may indicate that the neural network model 1710 is unable to process the image 1600 correctly (e.g., the neural network model 1710 has a bug and may be unable to generate a correct output in certain conditions, instances, situations, etc.) or may indicate that a scenario, set of circumstances, situation, etc., has occurred which may be of interest to users who create neural network models. It may be useful to store the sensor data (or a subset of the sensor data) so that the sensor data can be used to train and/or test other neural network models (e.g., other version of a neural network model, different neural network models, etc.).

Figure 8:
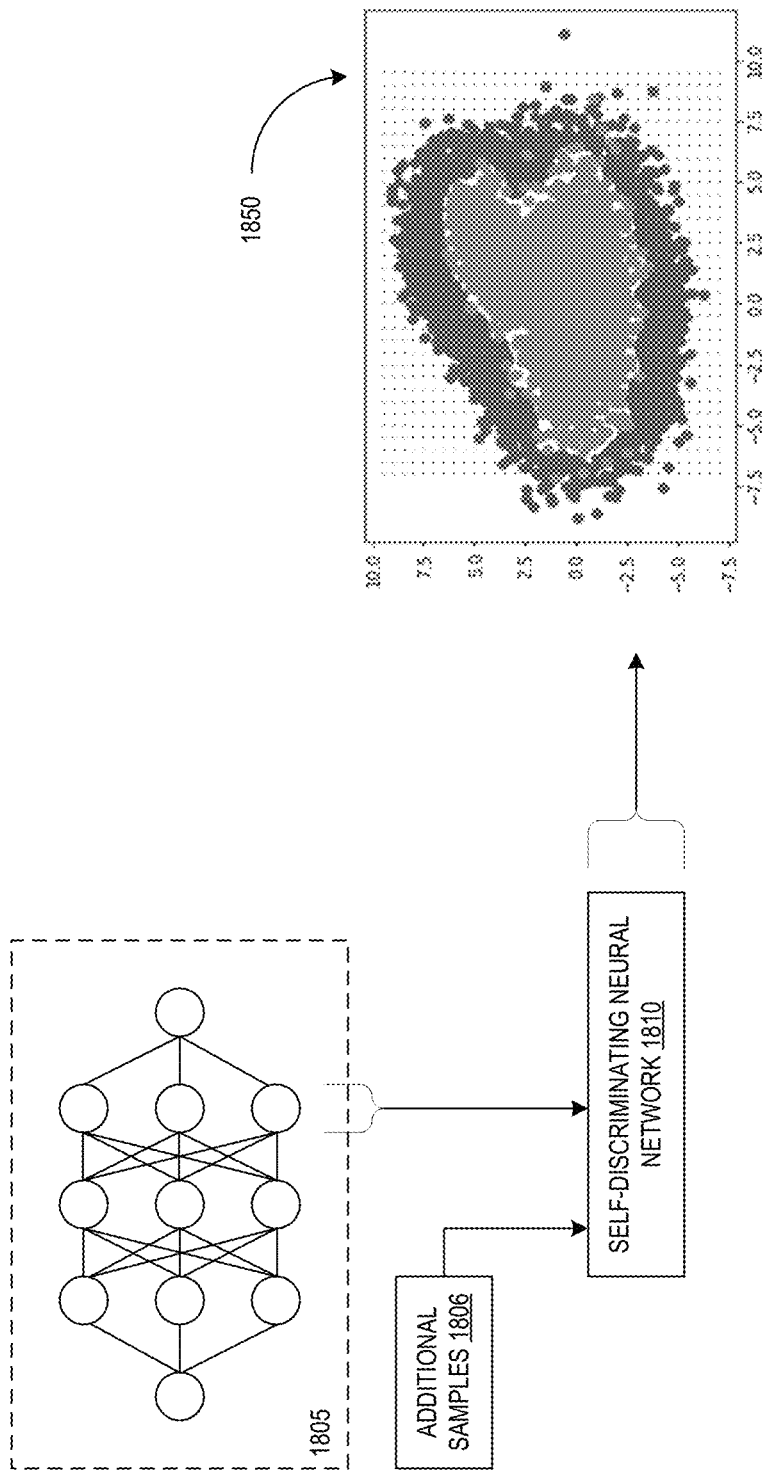
FIG. 8 is a diagram illustrating an example neural network model, in accordance with one or more embodiments of the present disclosure.

FIG. 8 is a diagram illustrating an example neural network model 1805, in accordance with one or more embodiments of the present disclosure. The neural network model 1805 may generate an output based on sensor data generated, captured, etc., by sensors of a vehicle. As discussed above, the neural network model 1805 model may be a neural network that includes various nodes (e.g., layers of nodes such as an input layer, an output layer, intermedia layers, fully connector layers, etc.) and various connections between the nodes. Each of the connections may be associated with a weight, as discussed above. Each node of the neural network model 1805 may provide an output to a node of a next layer via a connection. The output may be determined, calculated, generated, etc., based on the weight associated with a connection. The outputs of the nodes in an intermediate layer within the neural network model 1805 (e.g., a layer that is not the output layer) may be referred to as the feature space.

In one embodiment, a data collection module may generate, determine, calculate, etc., a distribution of samples (e.g., the data, the points, the data points) that represent the outputs of the intermediate layers or the feature space. The distribution of samples may be generated while training the self-discriminating neural network 1810 and/or the neural network model 1805 are trained. For example, training data may be used to train the neural network model 1805. As the neural network model 1805 is trained, the intermediate outputs of the intermediate layer may be provided to the self-discriminating neural network 1810 to train the self-discriminating neural network 1810.

The distribution of the outputs of the feature space is illustrated by the lighter portion (e.g., the lighter circles) of the graph 1850. Each axis of the graph may represent one of the dimensions that are used to represent the feature space of the neural network model 1805. The data collection module may generate additional samples 1806 based on the outputs of the feature space. For example, the data collection module may offset a sample by adding noise to a sample to generate an additional sample 1806. The additional samples 1806 may be referred to as negative samples. The additional samples 1806 (e.g., the negative samples) are represented in the graph 1850 by the darker portions (e.g., the darker circles). In one embodiment, the additional samples 1860 may define a boundary for the distribution of samples. The samples and the additional samples 1806 may be used to train the self-discriminating neural network 1810. After training the self-discriminating neural network 1810 with the samples (e.g., positive samples) and the negative samples, the self-discriminating neural network 1810 may continue to analyze/process the intermediate outputs generated by the neural network model 1805 as the neural network model analyzes/processes sensor data. The self-discriminating neural network 1810 may determine whether the intermediate outputs indicate that the sensor data includes candidate data. For example, if the intermediate outputs are outside the boundary of the distribution of samples, then the sensor data may include candidate data. If the intermediate outputs are within boundary of the distribution of samples, then the sensor data may not include candidate data. The self-discriminating network 1810 may execute in parallel with various production neural network models that may be executing within the vehicle. For example, the self-discriminating neural network 1810 may generate driving paths and may execute in parallel with a production neural network model (e.g., a production neural network) that also generates driving paths that are used to control the vehicle. The sensor data that is provided to the production neural network model may be simultaneously provided to the self-discriminating neural network 1810 so that the self-discriminating neural network 1810 can identify candidate data.

Figure 9:
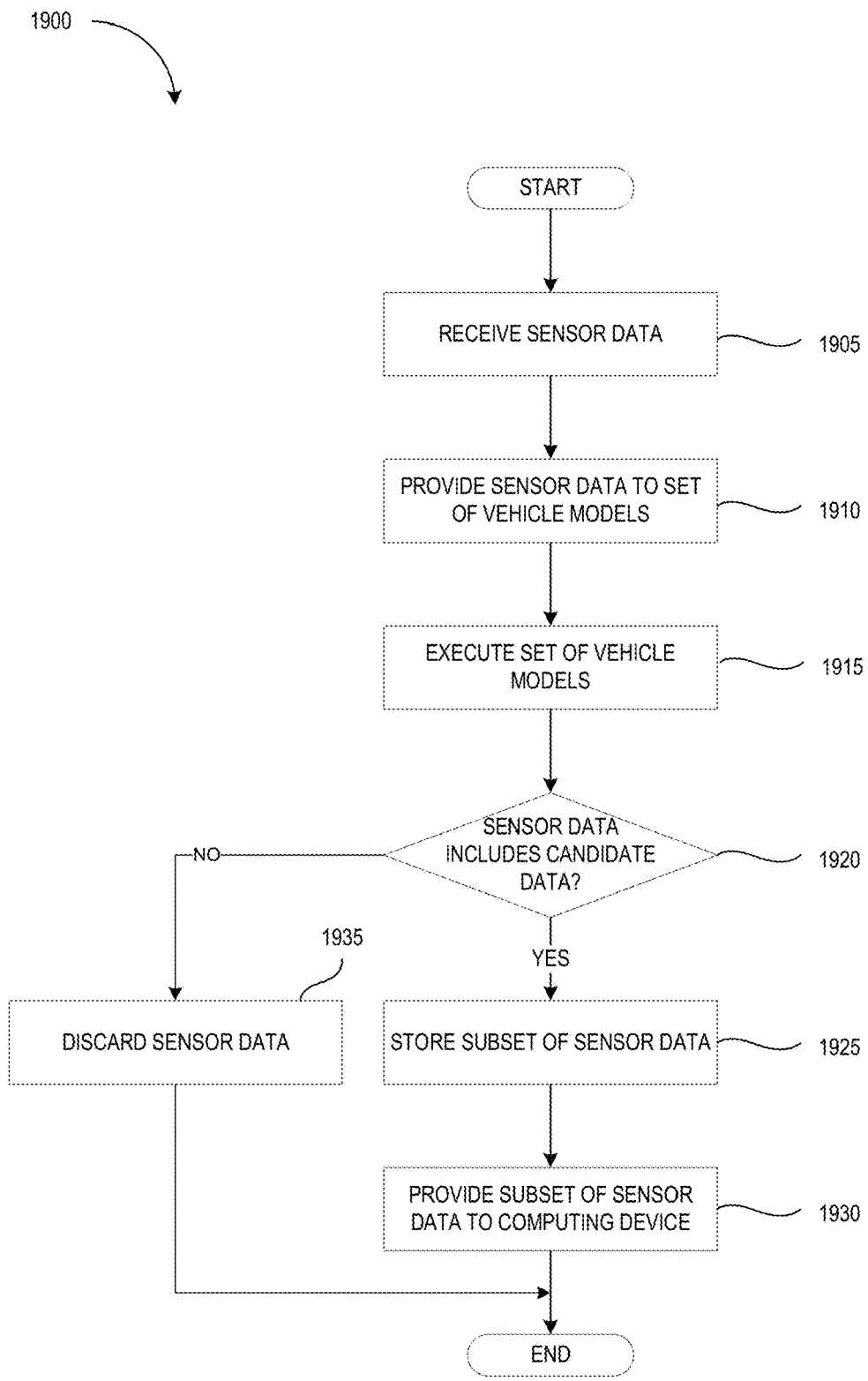
FIG. 9 is a flow diagram of a process for collecting sensor data, in accordance with one or more embodiments of the present disclosure.

FIG. 9 is a flow diagram of a process 1900 for collecting sensor data, in accordance with one or more embodiments of the present disclosure. Process 1900 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 1900 may be performed by a vehicle, components/systems of the vehicle (e.g., a prediction system, a path planning system, a perception system etc., as illustrated in FIG. 4A).

The process 1900 begins at block 1905 where the process 1900 receives sensor data from one or more sensors of the vehicle. For example, the process 1900 may receive video data (e.g., a video captured/generated by a video camera), LIDAR data, radar data, etc. The process 1900 may provide the sensor data to a set of neural network models (e.g., one or more neural network models) executing/operating on the vehicle at block 1910. The set of neural network models may lack the ability to control the actions, operations, and/or functions of the vehicle. The process 1900 may execute the set of neural network models at block 1915. At block 1920, the process 1900 may determine whether the sensor data includes candidate data. For example, the process 1900 may analyze the changes in the outputs of the one or more neural network models to determine whether the changes in the outputs exceeds a threshold, as discussed above. In another example, the process 1900 may determine whether the outputs of the one or more neural network models deviate from an expected output. In one embodiment, candidate sensor data may be sensor data that may indicate a scenario, set of circumstances, situation, etc., which may be of interest to users who create (e.g., program) neural network models (e.g., corner cases). Candidate sensor data may also be data that may cause a neural network model to have errors, generate improper/incorrect output (e.g., incorrect or improper paths, bounding boxes, object identifications, etc.), etc.

If the sensor data includes candidate data, the process 1900 may store a subset of the sensor data if the sensor data includes candidate sensor data at block 1925. For example, the process may determine a time T (or a time period) when the candidate sensor data was captured, generated, detected, etc., by sensors of the vehicle (e.g., when an interesting scenario, situation, etc., occurred). The process 1900 may store the sensor data from a period of time before the time T and a period of time after the time T, as discussed above. The process 1900 may provide the subset of the sensor data to the computing device at block 1930. For example, the process 1900 may transmit the subset of the sensor data to the computing device via a wireless network or via a physical cable. If the sensor data does not include candidate data, the process 1900 may discard the sensor data at block 1935. For example, the process 1900 may delete (e.g., erase) the sensor data or may allow the sensor data to be deleted and/or overwritten.

Figure 10:
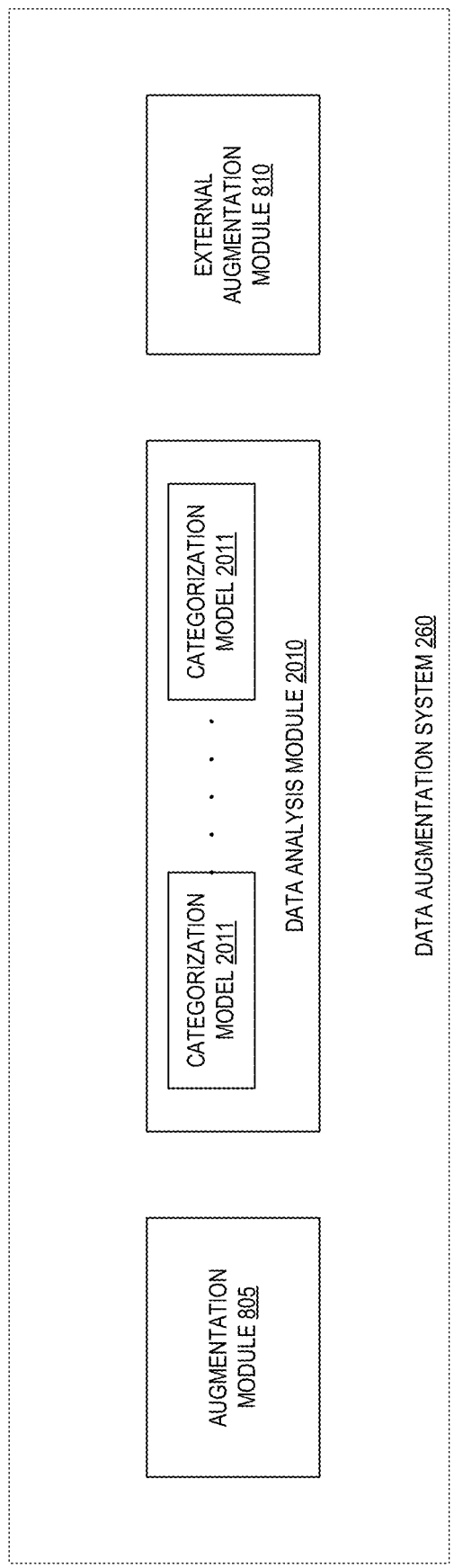
FIG. 10 is a block diagram that illustrates an example data augmentation system, in accordance with one or more embodiments of the present disclosure.

FIG. 10 is a block diagram that illustrates an example data augmentation system 260, in accordance with one or more embodiments of the present disclosure. The data augmentation system 260 includes an augmentation module 805, an external augmentation module 810, and a data analysis module 2010. Some or all of modules 805, 810, and 2010 may be implemented in software, hardware, firmware, or a combination thereof.

As discussed above, the augmentation module 805 may augment data, such as sensor data, candidate data, training data, etc., to include additional tags, labels, and/or annotations. This may be referred to as tagging, annotating, and/or labelling the data. The augmentation module 805 may include services, processes, applications, etc., that may analyze the selected and/or transformed data to augment the data. The external augmentation module 810 may interface or communicate with other (e.g., third party) services, processes, or applications to augment the data. The external augmentation module 810 may setup a secure communication channel to communicate with the other services, processes, or applications.

The data analysis module 2010 may receive candidate data sensed by a vehicle. For example, the vehicle may generate sensor data and may identify and/or select a subset of the sensor data based on a set of neural network models (e.g., test neural network models, a production/reference neural network model, etc.) executing on vehicle. As discussed above, the set of neural network models may lack the ability to control the vehicle (e.g., may be executing in shadow mode).

The data analysis module 2010 may determine whether the candidate data can be associated with one or more categories of a set of categories for data (e.g., categories for training data) using categorization models 2011. A categorization model may be a machine learning model that may associate candidate data with one or more categories. In one embodiment, a category may indicate that the data (e.g., the sensor/training data) includes information about different environments where a vehicle may be located. For example, a category may indicate road conditions in the environment (e.g., type of surface of the road, potholes in the road, etc.), traffic control devices in the environment (e.g., traffic signs, traffic lights, lane markers, colors of the traffic control devices, etc.), objects in the environment (e.g., cars, trucks, motorcycles, buildings, pedestrians, street lamps, sidewalks, etc.), the behavior/movement of objects in the environment (e.g., cars travelling at different speeds, a first car cutting off a second car, a pedestrian walking across the road, etc.), the type of environment (e.g., a parking lot, a local road, a freeway, a rural street, etc.), etc. Each category may be associated with and/or identified by a tag, an identifier, a name, etc. For example, the data augmentation system 260 and/or the data science system (e.g., data science system 110) may include a list, table, etc., of different categories (e.g., a list of names for the categories). The number of categories in the augmentation system 260 and/or the data science system may vary in different embodiments. For example, there may be thousands, hundreds of thousands, millions, or some other appropriate number of categories.

In one embodiment, the data analysis module 2010 may use a plurality of categorization models 2011 to determine whether candidate data (e.g., sensor data) can be associated with one or more categories. For example, the categorization model may be used to determine whether the candidate data can be associated with one or more existing categories in the data augmentation system 260 and/or the data science system. Each categorization model 2011 may be associated with one or more categories. For example, a first categorization model 2011 may determine whether the candidate data indicates a freeway environment with concrete roads, a second categorization model 2011 may indicate whether there is rain in the environment where a vehicle is located, and a third categorization model may determine whether an object that is detected is a car or a pedestrian. In another embodiment, the data analysis module 2010 may also use various rules to determine which categories should be associated with candidate data. For example, a rule may indicate that if the candidate data includes a timestamp that indicates that the candidate data was obtained before a certain time, the candidate data should be associated with a tag that indicates that the candidate data depicts a daytime environment.

In one embodiment, the data analysis module 2010 may associate the candidate data with a category in response to determining that the candidate data can be associated with that category. For example, a first categorization model 2011 may be associated with a first category (e.g., stop signs). If the first categorization model 2011 generates an output indicating that the candidate training should be associated with the first category (e.g., output indicating that a stop sign is depicted in the training data), the data analysis module 2010 may associate the candidate data with the first category.

In one embodiment, the data analysis module 2010 may associate data (e.g., candidate data, training data, sensor data, etc.) with a category (or multiple categories) by associating the data with a tag (e.g., a label, an annotation, a name, etc.) for that category (or for multiple categories). For example, the data analysis module 2010 may update the data to include the tag. In another example, the data analysis module 2010 may generate metadata indicating an associating between the data and the tag (e.g., may update a table, a list, etc.). This may be referred to as tagging the data.

In one embodiment, the data analysis module 2010 may determine whether the candidate data should be associated with a new or previously unknown category (e.g., category that is not currently part of the set of categories for the data science system and/or data augmentation system 260). For example, the data analysis module 2010 may generate a graph of a feature space of the outputs of one or more of the categorization models 2011, as discussed in more detail below. Based on the graph, the data analysis module 2010 and/or a user may determine that a new category should be created and/or included in the set of categories for the data augmentation system 260 and/or the data science system. The data analysis module 2010 may also associate the candidate data with the new category (e.g., may add a tab, label, annotation, etc., to the candidate data, may update metadata, etc.).

In one embodiment, the data analysis module 2010 may provide the candidate data to a user. For example, the data analysis module 2010 may present a user interface (e.g., a graphical user interface) to allow the user to view the candidate sensor data. This may allow the user (e.g., a data scientist, a programmer, etc.) to analyze the candidate sensor data and to determine whether a candidate data should be associated with a new category that was not previously in the set of categories for the data science system and/or the data augmentation system 260. For example, this may allow the user to determine whether a new category should be created and added to the set of categories of the data science system and/or the data augmentation system 260.

In one embodiment, data analysis module 2010 may create a new category for data based on user input. For example, the data analysis module 2010 may receive user input (e.g., via a GUI) indicating that a new category should be created and added to the set of categories of the data science system and/or the data augmentation system 260. The user input may also indicate an identifier (e.g., a name, a number, an alphanumeric string) for the new category.

In one embodiment, the data analysis module 2010 may determine whether additional training data should be created, generated, etc., based on the candidate data. For example, a category may be associated with different data (e.g., different sensor data, different training data). If the category is not associated with a threshold amount of data, the data analysis module 2010 may determine that additional training data should be generated based on the candidate data. For example, the candidate data may be associated with a category that does not have a threshold amount of data (e.g., a category that does not have many training data or samples). The data analysis module 2010 may generate additional training data by processing the candidate data using a generative adversarial network. The data analysis module 2010 may use the generative adversarial network to generate additional training data that is similar to the candidate data but changes one or more of the conditions and/or objects indicated by the training data. For example, the candidate data may indicate/depict an environment in the day time with clear weather (e.g., sunny, no rain, no clouds, etc.). The generative adversarial network may generate training data that depicts the same environment with different weather at a different time of date (e.g., at nighttime with rain). This may allow the data science system to create additional training data for training machine learning models (e.g., neural network models).

Figure 11:
FIG. 11 is a diagram illustrating an example graph, in accordance with one or more embodiments of the present disclosure.

FIG. 11 is a diagram illustrating an example graph 2100, in accordance with one or more embodiments of the present disclosure. The graph 2100 may be generated by a data analysis module (e.g., data analysis module 2010 illustrated in FIG. 10). For example, the data analysis module may analyze candidate data to generate the graph 2100. The graph 2100 may be used to determine whether candidate data can be associated with a new category that is not included in a set of existing categories of a data science platform.

In one embodiment, the graph 2100 may be generated based on the intermediate outputs of a layer of nodes within one or more categorization models (e.g., a set of categorization models). For example, a data analysis module may receive intermediate outputs from an intermediate node of a categorization model. The intermediate outputs may have a first dimension. The first dimension may be the size of the intermediate output. For example, the intermediate output may be an array or a tensor. The first dimension may be a size of the array or tensor. The data analysis module may reduce the dimension of the intermediate outputs. For example, the data analysis module may use various techniques, algorithms, etc., such as principal component analysis (PCA) or T-distributed stochastic neighbor embedding (TNSE), linear discriminant analysis (LDA), etc., to reduce the dimension of the intermediate outputs. Reducing the dimension of the intermediate outputs may be referred to as dimensionality reduction. The data analysis module may reduce the dimension of the intermediate outputs to a second dimension that is smaller than the first dimension (e.g., may reduce the dimension of the intermediate output from a higher dimension to a lower dimension).

After the dimension of the intermediate output has been reduce reduced, the data analysis module may plot the (dimension reduced) intermediate outputs onto the graph 2100. For example, each output may be represented as a circle on the graph 2100. The data analysis module may analyze the graph 2100 to determine whether there are points that do not correspond to an existing category. For example, the graph 2100 includes three clusters of points (e.g., intermediate outputs): cluster 2105, cluster 2110, and cluster 2115. The clusters 2105, 2110, and 2115 may be identified based on various clustering techniques, algorithms, etc., such as Gaussian mixture models, k-means, mean-shift, density-based spatial clustering of applications with noise (DBSCAN), etc. Cluster 2105 and cluster 2110 may already be associated with existing categories in the data science system. The data analysis module may detect cluster 2115 and may present the candidate data to the user (e.g., via a GUI, as discussed above) to allow the user to view the candidate data. The data analysis module may also indicate to the user that the candidate data may include data that does not fit into or cannot be associated with an existing category. This may allow the user to create a new category, as discussed above, or to save a particular sensor data for corner case scenarios not reflected in the existing clusters in the graph.

Figure 12:
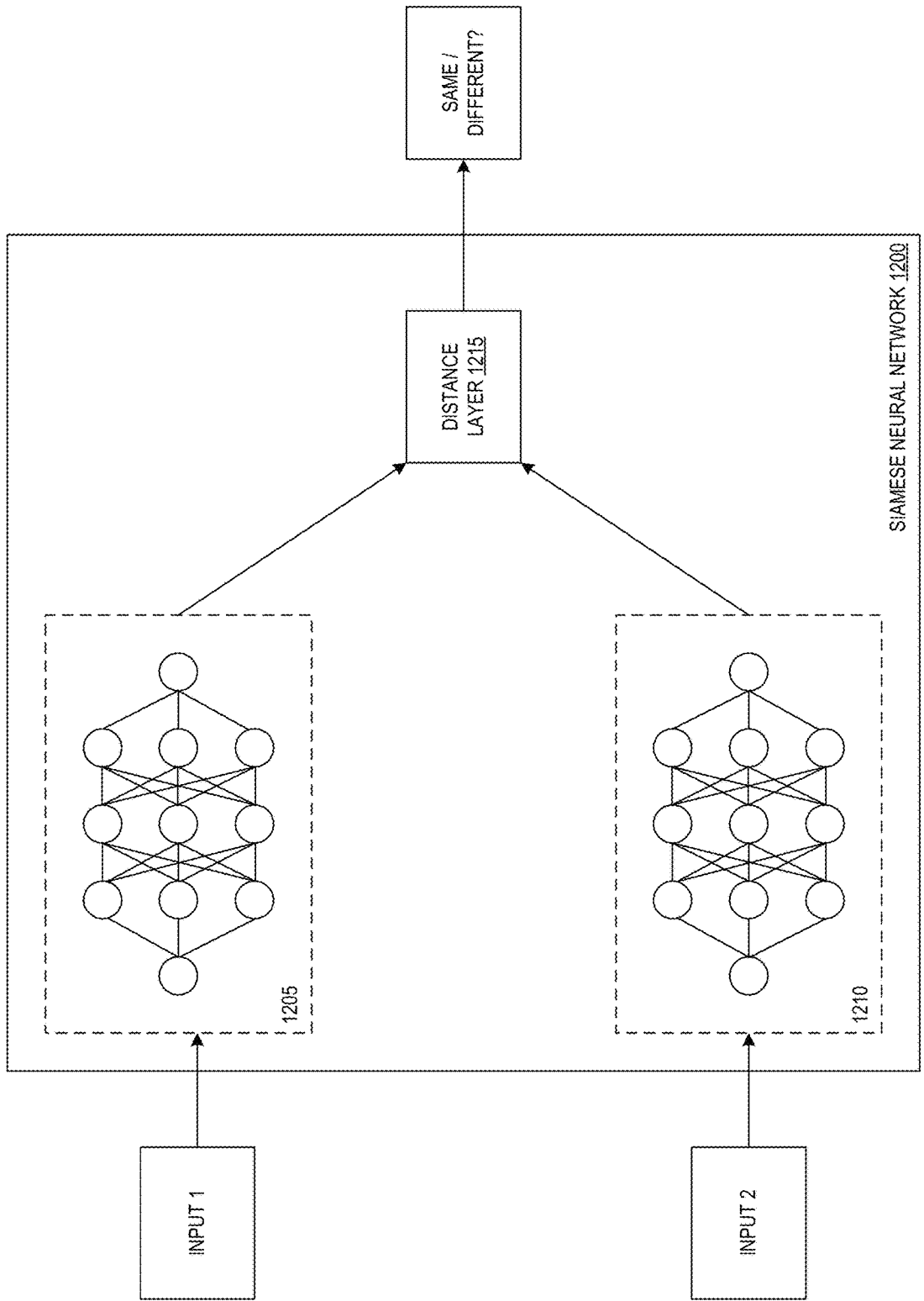
FIG. 12 is a diagram illustrating an example Siamese neural network, in accordance with one or more embodiments of the present disclosure.

FIG. 12 is a diagram illustrating an example Siamese neural network 1200, in accordance with one or more embodiments of the present disclosure. The Siamese neural network 1200 includes a first neural network 1205, a second neural network 1210, and a distance layer 1215. In one embodiment, the first neural network 1205 may be identical to the second neural network 1210. For example, the first neural network 1205 and the second neural network 1210 may include identical nodes, layers, connections, etc. In another example, the weights of the connections in the first neural network 1205 and the second neural network 1210 may be identical. The outputs of the first neural network 1205 and the second neural network 1210 are provided to a distance layer 1215. The distance layer 1215 may include additional nodes and/or connections, and each of the connections in the distance layer 1215 may also be associated with a weight. The distance layer 1215 may also be referred to as a distance function.

As illustrated in FIG. 12, input 1 and input 2 may be provided to Siamese neural network 1200. The first neural network 1205 may analyze input 1 and the second neural network 1210 may analyze input 2. Input 1 and input 2 may be sensor data such as images, video, etc. The Siamese neural network 1200 may each analyze input 1 and input 2 and determine whether the inputs are similar. For example, the first neural network 1205 and the second neural network 1210 may each analyze their respective inputs and provide their results to the distance layer 1215. The distance layer 1215 may determine whether input 1 is similar to input 2.

In one embodiment, a data analysis module (e.g., data analysis module 2010 illustrated in FIG. 10) may use the Siamese neural network 1200 to determine whether other existing data is similar to candidate data. As discussed above, the data analysis module 2010 may process and/or analyze candidate data. The data analysis module 2010 may determine that the candidate data indicates, depicts, etc., a new or interesting scenario, situation, etc. The data analysis module 2010 may determine that the candidate data should be used to train other neural network models. The data analysis module 2010 may use the Siamese neural network 1200 to determine whether previously collected sensor data is similar the candidate data. For example, the candidate data may be an image that depicts a certain type of vehicle. The data analysis module 2010 may provide the candidate data and another image to the Siamese neural network 1200 to determine whether the other image also depicts the same type of vehicle.

In one embodiment, the data analysis module 2010 may provide the candidate data and uncategorized data to the Siamese neural network 1200. If the Siamese neural network 1200 determines that the uncategorized data is similar to the candidate data, the data analysis module 2010 may associate the uncategorized data with the same tag (e.g., label) as the candidate data. The data analysis module 2010 may repeat this process for each piece of uncategorized data to help categorize the uncategorized data (e.g., to associate the uncategorized data with different tags, label, etc.).

Figure 13:
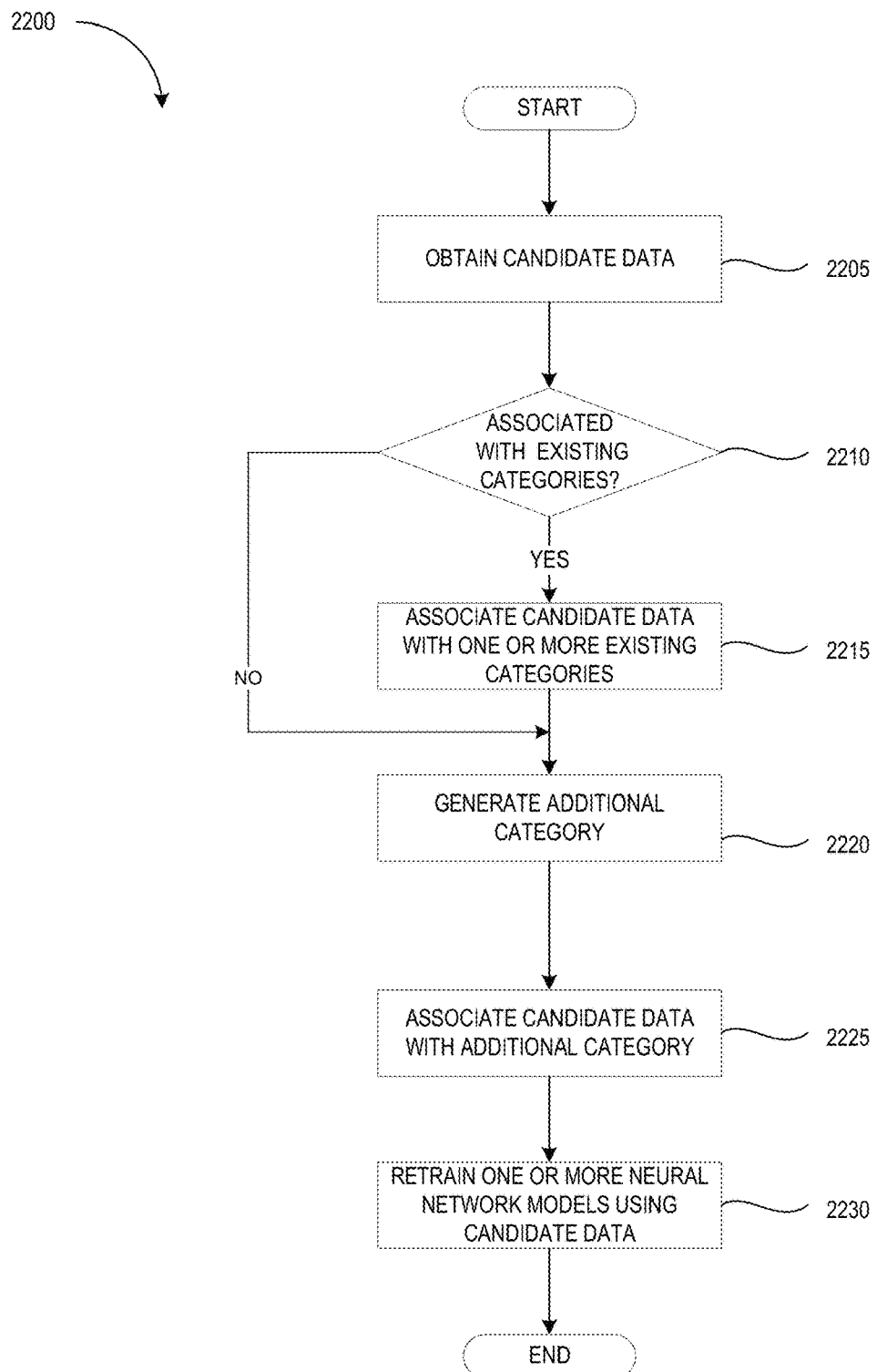
FIG. 13 is a flow diagram of a process for categorizing data, in accordance with one or more embodiments of the present disclosure.

FIG. 13 is a flow diagram of a process 2200 for categorizing data, in accordance with one or more embodiments of the present disclosure. Process 2200 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 2200 may be performed by a vehicle, components/systems of the vehicle (e.g., data analysis module as illustrated in FIG. 10).

The process 2200 begins at block 2205 where the process 2200 obtains candidate data that was generated by a vehicle. For example, the candidate data may be received from a vehicle and may be sensed, determined, generated, etc., by one or more sensors of the vehicle. In another example, the candidate data may be retrieved from a storage location (e.g., read from a disk drive, memory, etc.). The candidate data may be a subset of the data (e.g., sensor data, outputs of neural network models, CAN data, etc.) generated by the vehicle and analyzed by one or more vehicles models of the vehicle (e.g., vehicle modules executing in shadow mode), as discussed above. At block 2210, the process 2200 may determine whether the candidate data can be associated with one or more existing categories of a data science system. For example, the process 2200 may determine whether the candidate data depicts a situation, scenario, condition, circumstance, etc., that is represented by one or more existing categories (e.g., a set of categories for the data science system). The process 2200 may use various categorization models to determine whether the candidate data can be associated with one or more existing categories, as discussed above. For example, the process 2200 may process/analyze the candidate data using one or more categorization models. In another example, the process 2200 may perform dimensionality reduction and/or clustering on the feature space of one or more categorization models to determine that the candidate data can be associated with one or more existing categories, as discussed above. If the candidate data can be associated with one or more existing categories, the process 2200 may associate the candidate data with the one or more existing categories at block 2215. For example, the process 2200 may tag the candidate data by adding tags, labels, annotations, to the candidate data or by updating metadata to indicate the association to indicate that the candidate is associated with one or more existing categories.

At block 2220, the process 2200 may generate an additional category (e.g., a category that is not part of the set of existing categories, unknown new category, etc.). At block 2225, the process 2200 may associate the training data with the additional category (e.g., may add additional tags, annotations, labels, etc., to the candidate data). The process 2200 may also add the additional category (e.g., the new category) to the set of existing categories (e.g., may add the new/additional category to the set of existing categories) at block 2225. At block 2230, the process 2200 may retrain one or more neural network models using the candidate data. For example, the process 2200 may process the candidate data using one or more neural network models to generate new/updated weights for the one or more neural network models. The process 2200 may also validate and/or test one or more neural network models using the candidate data at block 2230.

Figure 14:
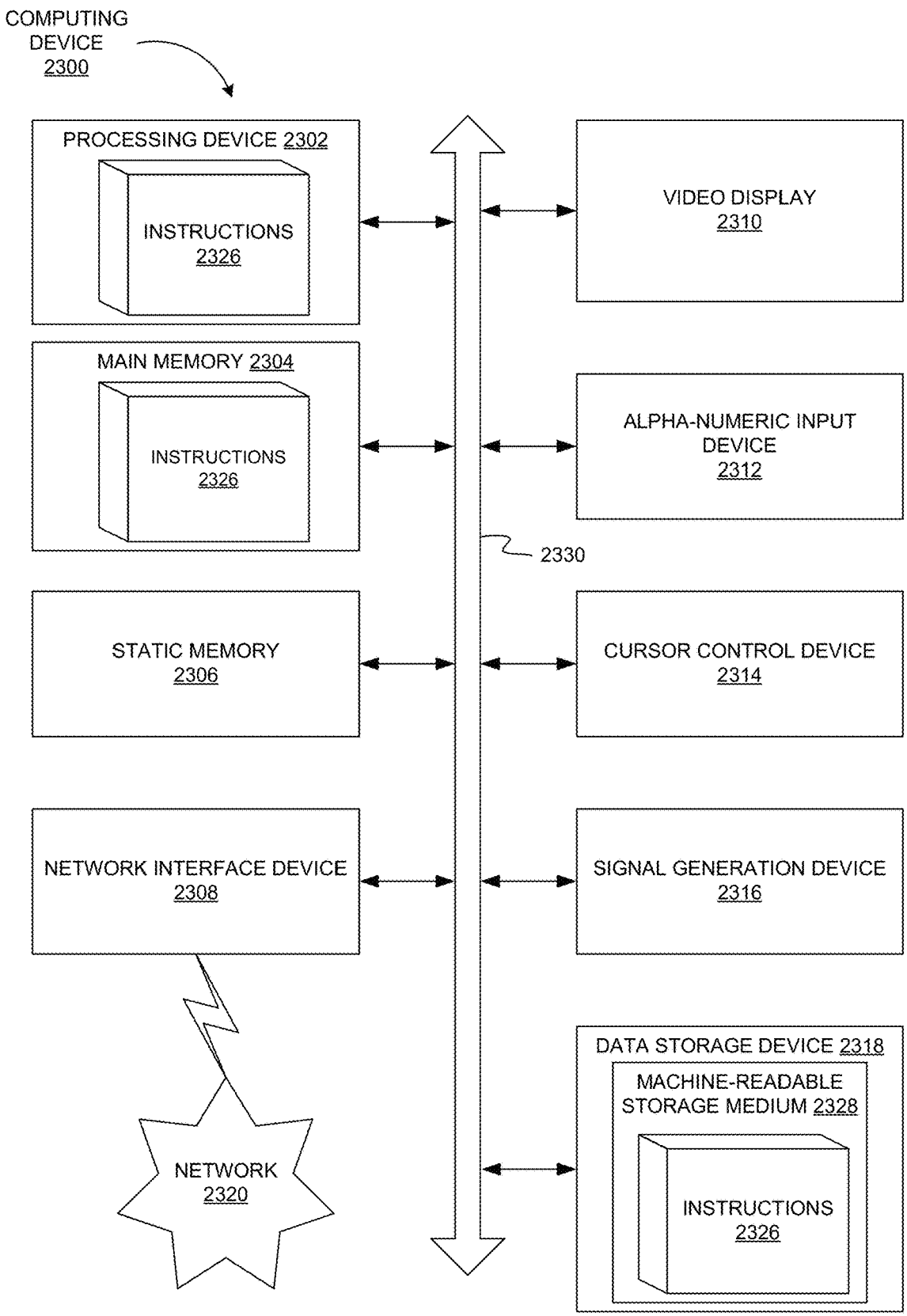
FIG. 14 is a block diagram of an example computing device that may perform one or more of the operations described herein, in accordance with some embodiments of the present disclosure.

FIG. 14 is a block diagram of an example computing device 2300 that may perform one or more of the operations described herein, in accordance with some embodiments. Computing device 2300 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 2300 may include a processing device (e.g., a general purpose processor, a PLD, etc.) 2302, a main memory 2304 (e.g., synchronous dynamic random access memory (DRAM), read-only memory (ROM)), a static memory 2306 (e.g., flash memory and a data storage device 2318), which may communicate with each other via a bus 2330.

Processing device 2302 may be provided by one or more general-purpose processing devices such as a microprocessor, central processing unit, or the like. In an illustrative example, processing device 2302 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 2302 may also comprise one or more special-purpose processing devices such as an application specific integrated circuit (ASIC), a field programmable gate array (FPGA), a digital signal processor (DSP), network processor, or the like. The processing device 2302 may be configured to execute the operations described herein, in accordance with one or more aspects of the present disclosure, for performing the operations and steps discussed herein.

Computing device 2300 may further include a network interface device 2308 which may communicate with a network 2320. The computing device 2300 also may include a video display unit 2310 (e.g., a liquid crystal display (LCD) or a cathode ray tube (CRT)), an alphanumeric input device 2312 (e.g., a keyboard), a cursor control device 2314 (e.g., a mouse) and an acoustic signal generation device 2316 (e.g., a speaker). In one embodiment, video display unit 2310, alphanumeric input device 2312, and cursor control device 2314 may be combined into a single component or device (e.g., an LCD touch screen).

Data storage device 2318 may include a computer-readable storage medium 2328 on which may be stored one or more sets of instructions, e.g., instructions for carrying out the operations described herein, in accordance with one or more aspects of the present disclosure. Instructions 2326 implementing the different systems described herein (e.g., the data science system 110, the data ingestion system 210, the data exploration system 220, the data selection system 230, the data transform system 240, the provisioning system 250, the data augmentation system 260, the development system 270, the post processing system 280, the vehicle management system 290, data collection module 1460, and/or data analysis module 2010 illustrated in FIGS. 1-23) may also reside, completely or at least partially, within main memory 2304 and/or within processing device 2302 during execution thereof by computing device 2300, main memory 2304 and processing device 2302 also constituting computer-readable media. The instructions may further be transmitted or received over a network 2320 via network interface device 2308.

While computer-readable storage medium 2328 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "obtaining," "determining," "associating," "including," "generating," "identifying," "transmitting," "receiving," "reducing," "tagging," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    obtaining candidate data generated by a vehicle using sensors of the vehicle;
    determining whether the candidate data can be associated with an existing set of vehicle environment categories by one or more neural network models for analyzing vehicle data;
    in response to determining that the candidate data cannot be associated with the existing set of vehicle environment categories:
        generating an additional vehicle environment category;
        adding the additional vehicle environment category to the existing set of vehicle environment categories;
        associating the candidate data with the additional vehicle environment category by tagging the candidate data with an identifier for the additional vehicle environment category; and
        retraining the one or more neural network models using the candidate data.

2. The method of claim 1, wherein each category of the existing set of vehicle environment categories is associated with a categorization model.

3. The method of claim 1, wherein determining whether the candidate data can be associated with the existing set of vehicle environment categories comprises:
    generating a graph of a feature space based on intermediate outputs of a set of categorization models; and
    identifying points within the graph that do not correspond to any category of the existing set of vehicle environment categories.

4. The method of claim 3, wherein generating the graph of the feature space comprises:
    reducing a dimension of the intermediate outputs from a first dimension to a second dimension, wherein the first dimension is larger than the second dimension.

5. The method of claim 1, further comprising:
    providing the candidate data to a user;
    receiving user input indicating that the additional vehicle environment category should be added to the existing set of vehicle environment categories and indicating an identifier for the additional vehicle environment category.

6. The method of claim 1, further comprising:
    associating the candidate data with one or more categories of the existing set of vehicle environment categories.

7. The method of claim 1, further comprising:
    generating data using a generative adversarial network, wherein the generated data is associated with the existing set of vehicle environment categories.

8. The method of claim 1, further comprising:
generating data using a generative adversarial network, wherein the generated data is associated with the additional vehicle environment category.

9. The method of claim 1, further comprising:
determining whether a set of uncategorized data is similar to the candidate data;
in response to determining that the set of uncategorized data is similar to the candidate data, associating the set of uncategorized data with a same tag as the candidate data.

10. The method of claim 9, wherein determining whether the set of uncategorized data is similar to the candidate data comprises:
providing the set of uncategorized data and the candidate data to a Siamese neural network; and
determining whether the set of uncategorized data is similar to the candidate data based on an output of the Siamese neural network.

11. An apparatus, comprising:
a memory configured to store data;
a processing device coupled to the memory, the processing device configured to:
obtaining candidate data generated by a vehicle using sensors of the vehicle;
determining whether the candidate data can be associated with an existing set of vehicle environment categories by one or more neural network models for analyzing vehicle data;
in response to determining that the candidate data cannot be associated with the existing set of vehicle environment categories:
generating an additional vehicle environment category;
adding the additional vehicle environment category to the existing set of vehicle environment categories;
associating the candidate data with the additional vehicle environment category by tagging the candidate data with an identifier for the additional vehicle environment category; and
retraining the one or more neural network models using the candidate data.

12. The apparatus of claim 11, wherein each category of the existing set of vehicle environment categories is associated with a categorization model.

13. The apparatus of claim 11, wherein to determine whether the candidate data can be associated with the existing set of vehicle environment categories the processing device is further configured to:
generate a graph of a feature space based on intermediate outputs of a set of categorization models; and
identify points within the graph that do not correspond to any category of the existing set of vehicle environment categories.

14. The apparatus of claim 13, wherein to generate the graph of the feature space the processing device is further configured to:
reduce a dimension of the intermediate outputs from a first dimension to a second dimension, wherein the first dimension is larger than the second dimension.

15. The apparatus of claim 11, wherein the processing device is further configured to:
receive user input indicating that the additional vehicle environment category should be added to the existing set of vehicle environment categories, wherein the user input further indicates an identifier for the additional vehicle environment category.

16. The apparatus of claim 11, wherein the processing device is further configured to:
generate data using a generative adversarial network, wherein the generated data is associated with the additional vehicle environment category.

17. The apparatus of claim 11, wherein the processing device is further configured to:
determine whether a set of uncategorized data is similar to the candidate data;
in response to determining that the set of uncategorized data is similar to the candidate data, associating the set of uncategorized data with a same tag as the candidate data.

18. The apparatus of claim 11, wherein to determine whether the set of uncategorized data is similar to the candidate data, the processing device is further configured to:
provide the set of uncategorized data and the candidate data to a Siamese neural network;
and determine whether the set of uncategorized data is similar to the candidate data based on
an output of the Siamese neural network.

19. A non-transitory computer-readable storage medium including instructions that, when executed by a processing device, cause the processing device to perform operations comprising:
obtaining candidate data generated by a vehicle using sensors of the vehicle;
determining whether the candidate data can be associated with an existing set of vehicle environment categories by one or more neural network models for analyzing vehicle data;
in response to determining that the candidate data cannot be associated with the existing set of vehicle environment categories:
generating an additional vehicle environment category;
adding the additional vehicle environment category to the existing set of vehicle environment categories;
associating the candidate data with the additional vehicle environment category by tagging the candidate data with an identifier for the additional vehicle environment category; and
retraining the one or more neural network models using the candidate data.

* * * * *

UNITED STATES PATENT AND TRADEMARK OFFICE
CERTIFICATE OF CORRECTION

PATENT NO. : 11,875,551 B2
APPLICATION NO. : 16/896938
DATED : January 16, 2024
INVENTOR(S) : Pratik Brahma, Nikhil George and Oleg Zabluda It is certified that error appears in the above-identified patent and that said Letters Patent is hereby corrected as shown below:

On the Title Page

Column 1, Lines 13-14, at "(73) Assignees":
Delete "NAVBIRSWAGEN AKTIENGESELLSCHAFT" and insert --VOLKSWAGEN AKTIENGESELLSCHAFT--.

Signed and Sealed this
Twenty-third Day of April, 2024

Katherine Kelly Vidal
*Director of the United States Patent and Trademark Office*